(12) United States Patent
Davis

(10) Patent No.: US 9,540,007 B1
(45) Date of Patent: Jan. 10, 2017

(54) VEHICLE CONTROL SYSTEM

(71) Applicant: Davis Intellectual Properties LLC, Asheville, NC (US)

(72) Inventor: Shannon R. Davis, Weaverville, NC (US)

(73) Assignee: Davis Intellectual Properties LLC

( * ) Notice: Subject to any disclaimer, the term of this patent is extended or adjusted under 35 U.S.C. 154(b) by 0 days.

(21) Appl. No.: 14/819,365

(22) Filed: Aug. 5, 2015

Related U.S. Application Data

(60) Provisional application No. 62/087,560, filed on Dec. 4, 2014.

(51) Int. Cl.
| | |
|---|---|
| *G06F 7/00* | (2006.01) |
| *B60W 30/18* | (2012.01) |
| *B60K 35/00* | (2006.01) |

(52) U.S. Cl.
CPC ............ *B60W 30/18* (2013.01); *B60K 35/00* (2013.01); *B60K 2350/1004* (2013.01); *B60K 2350/1076* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 2,548,495 A | * | 4/1951 | Robins ...................... | A63F 9/14 235/122 |
| 3,297,323 A | * | 1/1967 | Gibson, Jr. ............... | A63F 9/14 104/60 |
| 4,133,475 A | | 1/1979 | Harned et al. | |
| 4,174,833 A | * | 11/1979 | Hennig ..................... | A63F 9/00 273/442 |
| 4,327,519 A | * | 5/1982 | Cooper .................. | A63H 18/16 446/444 |

(Continued)

FOREIGN PATENT DOCUMENTS

| | | |
|---|---|---|
| CA | 1101745 | 5/1981 |
| EP | 1643121 | 4/2006 |
| WO | WO 2007/004904 | 1/2007 |

OTHER PUBLICATIONS

"MSD Installation Instructions," Dec. 2013, [retrieved from the internet Aug. 6, 2015], Retrieved from the Internet: URL<http://static.summitracing.com/global/images/instructions/MSD-7761.pdf>, 8 pages.

(Continued)

*Primary Examiner* — Ronnie Mancho
(74) *Attorney, Agent, or Firm* — Fish & Richardson P.C.

(57) ABSTRACT

In general, the subject matter described in this disclosure can be embodied in methods, systems, and program products for performing vehicle control. Multiple target rotation rates for a vehicle shaft may be identified. A first actual rotation rate may be determined to exceed a first target rotation rate. In response, a computing system may send a first signal in order to cause a first component of a vehicle to limit the rate of rotation of the vehicle shaft. A second actual rotation rate may be determined to be below a second target rotation rate. In response, the computing system may send a second signal in order to cause the first component of the vehicle or a second component of the vehicle to increase the rate of rotation of the vehicle shaft.

20 Claims, 9 Drawing Sheets

(56) References Cited

U.S. PATENT DOCUMENTS

| | | | | |
|---|---|---|---|---|
| 4,364,566 A | * | 12/1982 | Neuhierl | A63H 18/005 |
| | | | | 446/444 |
| 4,401,305 A | * | 8/1983 | Sano | A63H 18/14 |
| | | | | 446/444 |
| 5,197,786 A | * | 3/1993 | Eschenburg | B60B 37/00 |
| | | | | 180/258 |
| 6,721,648 B2 | | 4/2004 | Masters et al. | |
| 7,050,899 B2 | | 5/2006 | Masters et al. | |
| 8,554,440 B1 | | 10/2013 | Davis | |
| 8,930,113 B1 | | 1/2015 | Davis | |
| 2002/0013654 A1 | * | 1/2002 | Masters | B25J 9/16 |
| | | | | 701/110 |
| 2006/0017256 A1 | * | 1/2006 | Hupperich | B60G 9/00 |
| | | | | 280/124.156 |
| 2008/0137062 A1 | * | 6/2008 | Holton | G01S 17/88 |
| | | | | 356/28 |
| 2009/0272289 A1 | * | 11/2009 | Baker | A63G 7/00 |
| | | | | 104/76 |
| 2011/0169241 A1 | * | 7/2011 | Sheriff | B60G 9/00 |
| | | | | 280/124.117 |

OTHER PUBLICATIONS

'Dragzine.com' [online], "Tech Review: MSD's New Power Grid Programmable Ignition System," Aug. 9, 2011, [retrieved on Aug. 6, 2015], Retrieved from the Internet: URL<http://www.dragzine.com/tech-stories/ignition-electronics-efi/tech-review-msds-new-power-grid-programmable-ignition-system/>, 10 pages.

* cited by examiner

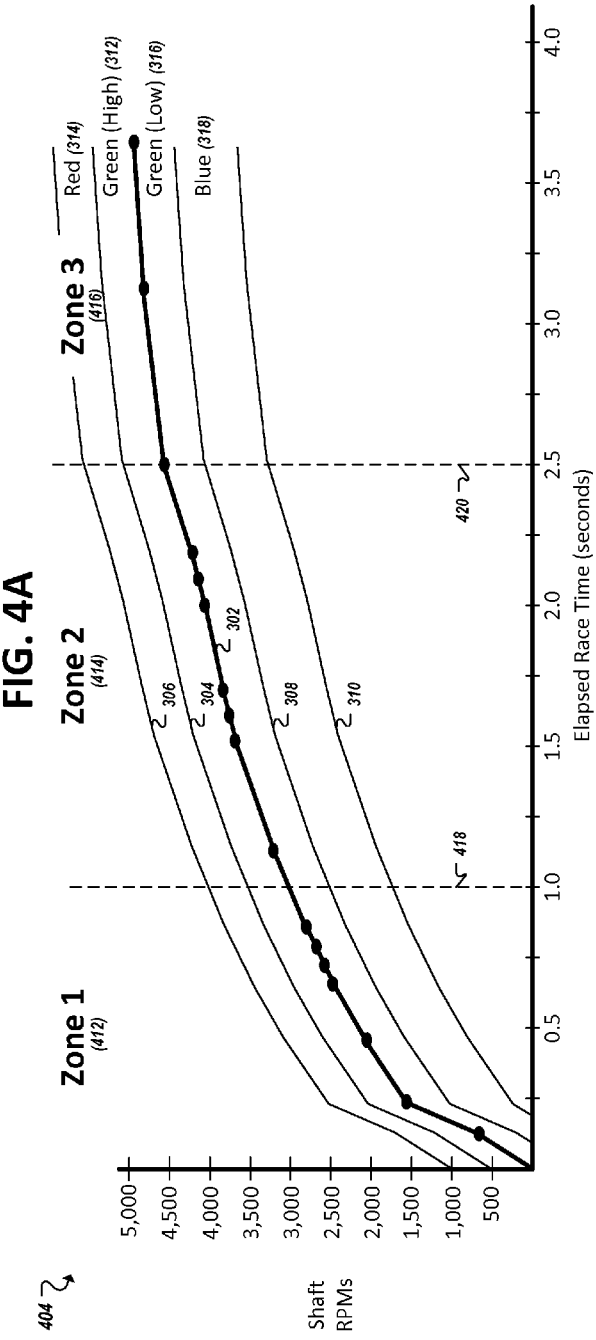

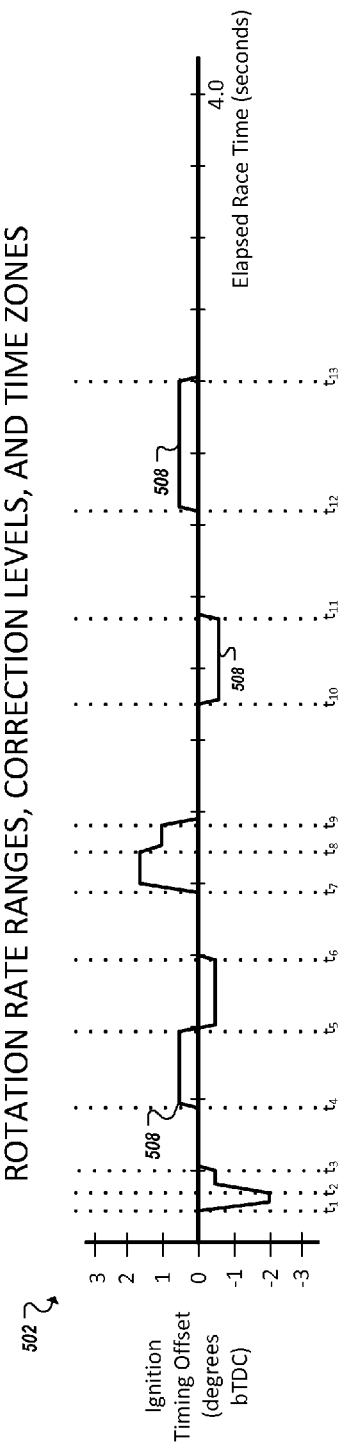
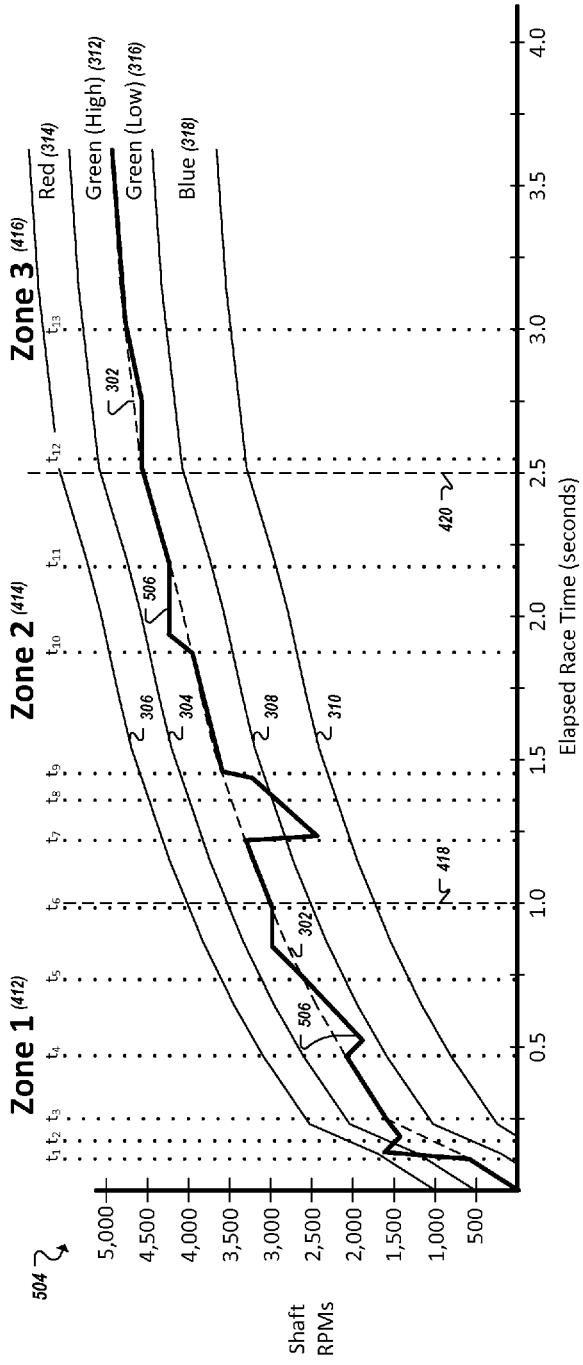
FIG. 5A
FIG. 5B

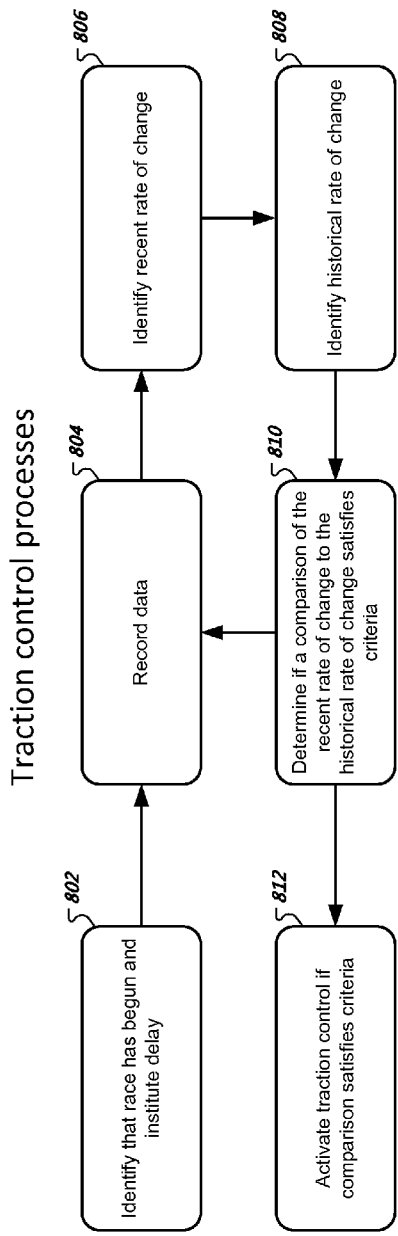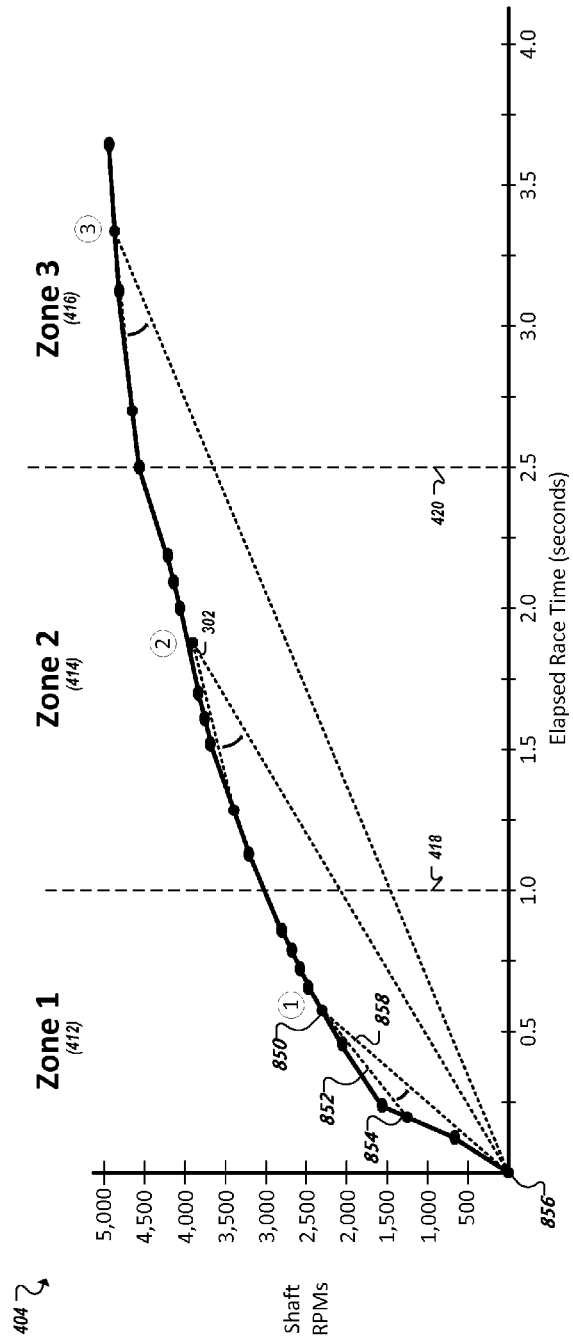

VEHICLE CONTROL SYSTEM

CROSS REFERENCE TO RELATED APPLICATIONS

This application claims the benefit of priority under 35 U.S.C. §119 of U.S. Provisional Application No. 62/087,560 filed Dec. 4, 2014, which is incorporated by reference herein in its entirety.

TECHNICAL FIELD

This document generally relates to controls for automotive vehicles.

BACKGROUND

Automotive racing in various forms has become an increasingly popular and competitive sport. Teams of engineers and drivers are constantly working to improve vehicle performance to maintain a competitive advantage in the sport. In drag racing, for example, only hundreds or thousandths of a second often separate the finishers of a drag race. Drag racers seek to generate a great amount of power with their vehicles, and to harness that power most effectively to propel the vehicle down a race track as quickly as possible. Drag racing vehicles, as well as other vehicles, rely on traction between the tires and the surface of the race track to accelerate the vehicle. When traction is compromised, the tires can begin to slip, resulting in lost acceleration and slower race times.

SUMMARY

This document describes, techniques, methods, systems, and other mechanisms for implementing control of automotive vehicles (e.g., shaft rotation rate control).

Particular implementations of the subject matter described herein can, in certain instances, realize one or more of the following advantages. First, a target run curve can be generated that identifies a series of target vehicle shaft rotation rates for particular times during an anticipated race. The target rotation rates may be different at different points in time of the race, rather than being a constant threshold rate for the entire race. Varying the target rotation rate according to the time in the race can be beneficial because a vehicle may realize optimal performance with different vehicle shaft rotation rates during different portions of the race. Second, the target run curve can be generated based on vehicle run data from one or more previous races, and can therefore reflect realistic vehicle performance. Moreover, the target run curve may be tailored to particular vehicles, particular tracks, and other specified race conditions in order to further improve vehicle performance in race conditions that match or are similar to those to which the target run curve is tailored. Third, using the target run curve, a vehicle controller can automatically take corrective action to slow or increase the actual vehicle shaft rotation rate of a vehicle based on whether the actual rate is measured to be above or below a target rate indicated by the target run curve. The corrective action can be taken automatically without requiring the driver to make any manual adjustments. In some implementations, the corrective action can involve making ignition timing adjustments.

As additional description to the embodiments described below, the present disclosure describes the following embodiments.

Embodiment 1 is a computer-implemented method, comprising identifying, by a computing system that is configured to control a rate of rotation of a vehicle shaft of a vehicle, multiple target rotation rates for the vehicle shaft that correspond to respective times during an anticipated vehicle race, at least some of the multiple target rotation rates being different from each other. The computing system determines that (1) a first actual rotation rate for the vehicle shaft at a first time during a first actual vehicle race exceeds (2) a first target rotation rate, from among the multiple target rotation rates, that is for a first time during the anticipated vehicle race that corresponds to the first time during the first actual vehicle race. The computing system sends, in response to having determined that the first actual rotation rate exceeds the first target rotation rate, a first signal for receipt by a component of the vehicle, in order to cause the component of the vehicle to limit the rate of rotation of the vehicle shaft. The computing system determines that (1) a second actual rotation rate for the vehicle shaft at a second time during the first actual vehicle race is below (2) a second target rotation rate, from among the multiple target rotation rates, that is for a second time during the anticipated vehicle race that corresponds to the second time during the first actual vehicle race. The computing system sends, in response to having determined that the second actual rotation rate is below the second target rotation rate, a second signal for receipt by the component of the vehicle, in order to cause the component of the vehicle to increase the rate of rotation of the vehicle shaft.

Embodiment 2 is the computer-implemented method of claim 1, wherein sending the first signal for receipt by the component of the vehicle causes the component of the vehicle to limit the rate of rotation of the vehicle shaft by reducing the rate of rotation of the vehicle shaft.

Embodiment 3 is the computer-implemented method of claim 1. The method further includes identifying, for each of one or more past races, data that indicates actual vehicle shaft rotation rates for corresponding times during each of the one or more past races. The method further includes determining, based on the data that indicates the actual vehicle shaft rotation rates for each of the one or more past races, the multiple target rotation rates for the anticipated race.

Embodiment 4 is the computer-implemented method of claim 3, wherein identifying the data that indicates actual vehicle shaft rotation rates comprises identifying, for each of multiple past races, a set of data that indicates actual vehicle shaft rotation rates. Moreover, determining the multiple target rotation rates for the anticipated race comprises combining each identified set of data that indicates actual vehicle shaft rotation rates.

Embodiment 5 is the computer-implemented method of claim 3, further comprising combining the data that indicates actual vehicle shaft rotation rates for each of the one or more past races to create a preliminary run curve that specifies preliminary target rotation rates for times during the anticipated race. The method further comprises creating a target run curve that specifies the multiple target rotation rates by affecting changes to a preliminary target rotation rate specified by the preliminary run curve.

Embodiment 6 is the computer-implemented method of claim 5 wherein creating the target run curve comprises (1) presenting a plotted representation of the preliminary run curve within a graphical user interface on an electronic display; (2) identifying that user input has selected and dragged a portion of the plotted representation of the preliminary run curve that corresponds to the preliminary target rotation rate specified by the preliminary run curve; and (3) changing the preliminary target rotation rate based on an amount that the user input dragged the portion of the plotted representation of the preliminary run curve.

Embodiment 7 is the computer-implemented method of claim 1, further comprising determining a first amount for which the first signal is to specify that the rate of rotation of the vehicle shaft be limited based on a first amount that the first actual rotation rate is determined to exceed the first target rotation rate, wherein the first signal indicates the first amount for which the rate of rotation of the vehicle shaft is to be limited.

Embodiment 8 is the computer-implemented method of claim 7, further comprising identifying that the first time during the anticipated vehicle race occurs within a first time zone of the anticipated race, from among multiple time zones of the anticipated race, wherein each of the multiple time zones of the anticipated race corresponds to a different portion of the anticipated race, wherein at least some of the multiple time zones are assigned different values for limiting the rate of rotation of the vehicle shaft by different amounts when an actual rotation rate for the vehicle shaft is determined to exceed a corresponding target rotation rate for the vehicle shaft by the first amount.

Embodiment 9 is the computer-implemented method of claim 1, wherein the first signal identifies an amount of ignition timing retard that is to be affected by the component of the vehicle in order to cause the component of the vehicle to limit the rate of rotation of the vehicle shaft.

Embodiment 10 is the computer-implemented method of claim 9, wherein the second signal identifies an amount of ignition timing advance that is to be affected by the component of the vehicle in order to cause the component of the vehicle to increase the rate of rotation of the vehicle shaft.

Embodiment 11 is directed to one or more non-transitory computer-readable media having instructions stored thereon that, when executed by one or more processors, cause performance of operations according to the method of any one of embodiments 1-10.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 4A shows a screenshot of an example GUI for setting time zones and correction levels in terms of ignition timing offsets.

FIG. 4B shows a plot of the target run curve from FIG. 3 segmented into three time zones over the duration of an anticipated race.

FIG. 5A shows a plot of ignition timing adjustments being made during an actual race.

FIG. 5B shows a plot of actual vehicle shaft rotation rates during the actual race that led to the ignition timing adjustments shown in FIG. 5A.

FIG. 8A shows a flowchart of an example traction control process.

FIG. 8B shows an illustration of measurements involved in determining whether traction control should be activated.

Like reference numbers and designations in the various drawings indicate like elements.

DETAILED DESCRIPTION

Figure 1:
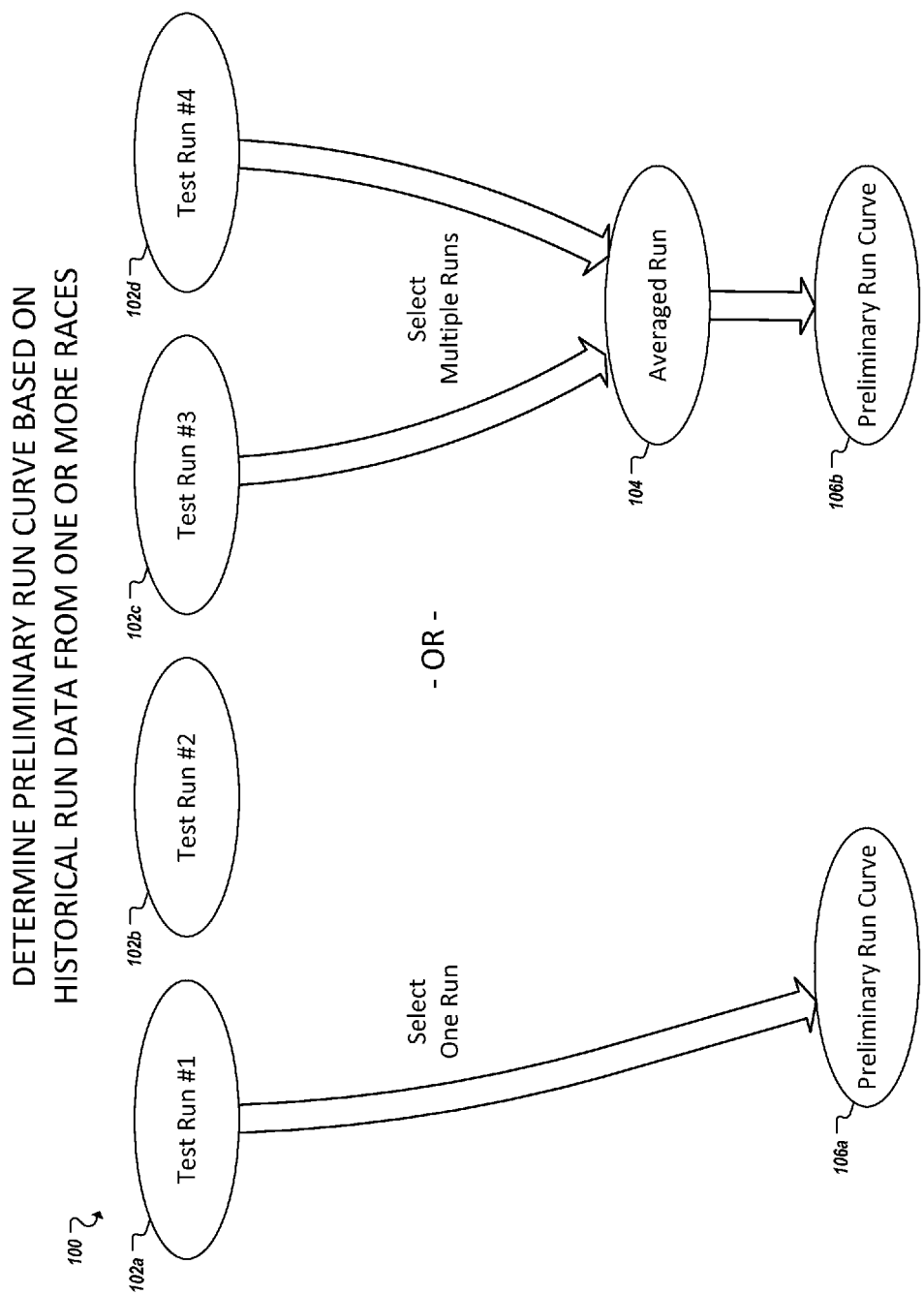
FIG. 1 shows a schematic diagram of an example process for selecting vehicle run data that can be used as a preliminary run curve for an anticipated race.

This document generally describes techniques, methods, systems, and other mechanisms for creating and implementing a target run curve that is usable to dynamically control a variable vehicle shaft rotation rate during operation of an automotive vehicle, such as during a race. This document also describes other techniques, methods, systems and mechanisms, such as those to reduce power applied to driven wheels, to perform traction control, and to restart power enhancements.

In drag racing and other types of automotive racing, one obstacle to achieving lower run times is lost acceleration that results from a loss of traction between one or more tires of the racing vehicle and the surface of the race track. When the tires lose traction with the track surface, the wheels can begin to spin faster than the car is propelled. The vehicle is therefore unable to achieve maximum speed or acceleration, and control of the vehicle is also compromised. During other periods of a race, rather than experiencing traction loss due to wheel slippage, the wheels may instead be driven with insufficient power such that there is a needlessly large gap between the actual rotation rate of one or more wheels of the vehicle and the maximum rotation rate that could be sustained before losing traction. In either case, an optimal wheel rotation rate is not realized.

This document describes techniques by which wheel rotation rates throughout the duration of a race may be brought closer to their optimal rotation rates, so as to reduce or prevent instances of lost traction, and to increase the wheel rotation rates where it can be sustained. These techniques can result in faster race times, greater vehicle control, and reduced tire shake. Because the rate of rotation of the wheels is generally a function of the rate of rotation of certain vehicle shaft components of the vehicle, the vehicle shaft rotation rate can act as a proxy for the wheel rotation rate in some implementations. Accordingly, wheel rotation rate may be measured and controlled by corresponding measurements and control of a vehicle shaft rotation rate. For example, the driveshaft rotation rate (e.g., driveshaft RPMs) can be a reliable indicator of the wheel rotation rates of one or more wheels that are driven directly or indirectly by the driveshaft.

As is described further below with respect to the figures, a target run curve can be generated that identifies target vehicle shaft rotation rates at a series of times throughout the course of an anticipated race. The target run curve can be created based on recorded data of the actual vehicle shaft rotation rates at a series of times over the course of an actual, prior race. Data from one or more prior races can be selected as a preliminary run curve from which the target run curve will be created. In some implementations, when race data from multiple prior runs are used, the data can be averaged or otherwise combined to form the preliminary run curve. The preliminary run curve can then be adjusted in various ways to create the target run curve. For example, a user may manipulate a plot of the preliminary run curve in a graphical user interface ("GUI") presented on an electronic display to smooth portions of the run curve where unwanted slipping may have occurred due to loss traction, where the vehicle shaft rotation rate dipped from an optimal rotation rate for a period of time, or where tire shake may have occurred. These adjustments can involve "smoothing" because spikes and dips in the preliminary run curve may be removed by smoothing them over.

When the adjustments to the preliminary run curve are completed, the result is a target run curve that specifies target rotation rates of a vehicle shaft during the run of an anticipated race. The target run curve can be loaded into a controller on a vehicle that is programmed to cause one or more components of the vehicle to take corrective action when it is detected that, during a race, an actual measured vehicle shaft rotation rate is above or below the target rotation rate at a corresponding time of the race, as indicated by the target run curve. The types and amount of corrective action taken during the race may be based on a set of pre-configured parameters. For example, one type of corrective action that can be taken to affect an increase or decrease of the vehicle shaft rotation rate is ignition timing adjustments. In some implementations, ignition timing can be retarded when the actual vehicle shaft rotation rate exceeds the target rate, and ignition timing can be advanced when the actual vehicle shaft rotation rate falls below the target rate. The amount that the timing is advanced or retarded can be based on correction levels that may be automatically determined or that can be input by a user.

Another type of corrective action that can be taken to affect an increase or decrease of the vehicle shaft rotation rate is inhibiting the firing of engine cylinders. Stated another way, in order to retard the actual vehicle shaft rotation rate, one or more cylinders can be "dropped." This can be performed by preventing a sparkplug in an engine from firing. In a four-stroke internal combustion engine, this means that a particular sparkplug will not fire for two consecutive revolutions of the engine crankshaft. This cylinder "dropping" can be performed at different engine revolutions-per-minute (RPMs), and is not solely to limit the engine RPMs from exceeding a maximum value (e.g., so that the engine RPMs do not exceed 9000 RPMs at any time during a race).

The correction levels may vary, in some implementations, depending on the portion of the race in which the correction is to be applied (e.g., during which of multiple pre-defined time zones in the race that the difference between actual and target rotation rates was detected), and also based on the magnitude of the difference between the actual and target rotation rates. For example, in each time zone of the race, multiple ranges of rotation rates above and below the target run curve may be defined such that different levels of vehicle shaft rotation correction are applied based on which range the actual vehicle shaft rotation rate falls within. The vehicle shaft rotation correction may be include different ignition timing adjustments or different numbers of cylinders being dropped.

Before describing the figures in further detail, it is first worth discussing various aspects of automotive racing that can impact the performance of a vehicle during a race. To begin, drag cars (as well as cars and vehicles of other types) apply force to the wheel and tire in order to "push" against the track surface and accelerate the car. The force transmitted to the track surface is a frictional force because the tire is generally not mechanically attached to the track surface, but instead rests atop the track surface due to gravity and the weight of the car.

The area where each of the tires contacts the track surface is referred to as the contact patch. When the contact patch is stationary with respect to the track surface, the drag car system applies a static friction force on the track surface. If the contact patch is moving with respect to the track surface, the tire is said to be "slipping" and the system is applying sliding friction force. In the context of the meeting of tire and track surfaces, the potential static friction force will generally exceed the potential sliding friction force. In other words, an excessively slipping tire generally cannot apply as much accelerating force as can a non-slipping tire or a tire that is slipping minimally. Therefore, better performance generally results from a system that applies the maximum static friction force or minimal sliding friction force without exceeding said force, thereby accelerating the car without excessively spinning or slipping the tire. It is desirable to apply as much force as possible to the contact patch without excessively slipping the tire (wheel spin). Wheel spin can be the result of exceeding the maximum static friction force of the junction of tire and track surface.

Force can be transmitted to the contact patch from the wheel and through the body of the tire. The tire can function as a spring in some sense. When torque is applied through the drive mechanism to the wheel, the tire can transmit the force through the sidewalls of the tire to the contact patch. Since the car cannot instantaneously obtain velocity, the tire flexes to absorb some of the energy being applied.

The tire, in this scenario, stores some of the applied force in the form of tension in the sidewalls. The tire may be thought of as a wound spring that is constantly trying to unwind. In order to unwind, or to give up its stored energy, the inside circumference of the tire (where it contacts the wheel) generally must slow with relation to the outside circumference of the tire (where it meets the track surface) or the outside of the tire must accelerate with respect to the inside circumference of the tire.

The result is that the tire becomes a balancing component that exists between the wheel and the contact patch. When force is applied by the wheel, energy is accumulated in the tire and force is transmitted to the contact patch. The amount of energy stored in the tire fluctuates as a result in changes in the force applied by the wheel (input) and the force applied to the contact patch (output). When the energy or flex of the tire is near its maximum, the tire becomes a source of energy that can apply force to contact patch. When the energy or flex of the tire is near its minimum, the tire becomes an energy sink that can accept force from the wheel.

If the energy stored in the tire is allowed to fluctuate too much or too rapidly, this can result in a state of oscillation wherein the energy stored in the tire and the force applied to the contact patch increase and decrease rapidly and repeatedly. This can greatly increase the probability that the static friction force of the contact patch will be exceeded and wheel spin will be the result. This condition is referred to as "tire shake" and is evidenced by vibration and oscillation throughout the drag car system, including the driveshaft.

In summary, it can be said that a desired state of the tire is for it to store a constant or nearly constant amount of energy. In this state, the force applied to the contact patch is stable and the average applied force may be maintained much closer to the limit of static friction force. When the energy stored by the tire is allowed to oscillate, wheel spin is more likely and the oscillation is passed to other parts of the system.

The wheel can be driven by an axle, which in turn can be driven by a differential, which in turn can be driven by a driveshaft. These components are, for the most part, mechanically linked and may transmit force nearly instantaneously.

Drag cars can include a suspension system. In order to maintain a stable and predictable coefficient of friction with regard to the contact patch, a system of springs and dampeners can be employed. A goal of this system is to dampen fluctuations of force in the contact patch due to weight transfer in the chassis of the car and track surface irregularities.

The weight transfer in the chassis under acceleration can be of particular concern. When the car begins to accelerate, weight is effectively transferred to the rear of the vehicle. The front of the car rises and the rear of the car lowers (e.g., "squats"). The suspension can accommodate this movement and absorb some of the associated energy. As with the body of the tire, the suspension can become a balancing component in the system that stores energy that is input and releases this energy when allowed.

As with other parts of the system, the suspension can oscillate and transmit these oscillations to the system as a whole. This is undesirable as it can cause the static friction force of the contact patch to be exceeded, or the coefficient of friction to be reduced, either of which can result in wheel spin.

Though the suspension is tuned with spring rates and dampening rates, it is still a component in the overall system of power delivery. As in the case of the tire, it is desirable to maintain equilibrium in the amount of stored energy of the suspension and the most accessible control is the force that is input.

Upstream of the driveshaft is the transmission. The transmission can function to select different gear ratios in order to keep the engine speed in the range where the engine is able to produce power most efficiently. When the transmission changes gears, the flow of power in the system is momentarily disrupted with a surge of force as the engine speed stabilizes. This potential cause of wheel spin should be counteracted for a competitive run.

A device called a torque converter can link the transmission to the engine. The torque converter can act as an energy dissipater in the system that accepts rotational force from the engine and that transmits the force to the transmission, while also having the ability to absorb some of the input force and convert it to heat. The torque converter can be adjusted in various ways to change how much force it transmits or absorbs and how quickly it does so.

Though not all drag cars have a clutch, when it exists the clutch can be operable to act as a disconnect between the engine and the drive train. In drag racing, the clutch can be a very important element in the transmittal of power. On some cars, the clutch can be engaged to launch the car. The clutch may be designed to "slip" or absorb energy and convert it to heat as a means of managing the force applied at the tire. The amount of power transmitted during the slip, the time the clutch is allowed to slip, and the regressive characteristic of the slip can be important factors.

One technique for clutch-slip management can be implemented using adjustable weights within the clutch assembly. The weights can apply centrifugal force (centripetal acceleration) that cause the clutch to reduce slippage as the rotational speed increases. This technique can be balanced against the engine power applied. If the engine power is reduced while the clutch is slipping, it may allow the clutch to suddenly lock and apply a surge of power to the drive train and tire.

The engine produces power for the drag car system. The amount of torque the engine produces can be controlled with a throttle that restricts the flow of air and fuel to the engine. A secondary manner of controlling engine torque includes controlling the ignition timing. A third manner of controlling engine torque includes inhibiting the firing of one or more engine cylinders.

Ignition timing can include determining the angular position of the crankshaft, in relation to a set point, at which the spark is fired in the cylinder. As the shaft rotates, so each piston moves through its compression stroke to its power stroke at which point the spark fires to ignite the fuel which exerts force on the piston.

The point of time in the engine cycle when the spark fires can be precisely controlled to obtain maximum power. If the spark fires too early, the fuel will burn early and resist the compressing piston. If the spark fires too late, power will be lost because time that could have been used to burn fuel was wasted. Ignition timing can thus be used to apply a limited control to the power that the engine produces for a given throttle position.

Additionally, to assist the engine in its production of power, a turbocharger or mechanically-driven blower may be used. These devices can significantly increase power, but usually do so in an uneven—but predictable—way. Most commonly, they cause a surge in power at a specific engine RPM.

Some drag cars use a system that injects nitrous oxide into the fuel mix. When this gas decomposes, it releases extra molecules of oxygen to help the combustion process. The result can be a significant surge of engine power. These systems can offer additional control of output power via manipulation of the rate of nitrous oxide gas injection.

With reference now to FIG. 1, a schematic diagram is shown of an example process 100 for selecting vehicle run data that can be used as a preliminary run curve for an anticipated race. The preliminary run curve can indicate a series of values of a vehicle shaft rotation rate for corresponding times over the course of an anticipated race, and the series of values can be based on actual vehicle shaft rotation rates recorded from one or more previous races selected by a user. The preliminary run curve may not be based on ideal data that models an optimal race, but it can nonetheless be used as a starting point for creating a target run curve that indicates target vehicle shaft rotation rates during the course of a race. As described below with respect to FIG. 2, the preliminary run curve may be processed and adjusted to generate such a target run curve that more closely models the optimal performance of a vehicle shaft's rotation rate over the course of an anticipated race. A vehicle controller can then use the target run curve to determine whether to increase or decrease an actual vehicle shaft rotation rate during an actual race based on whether the actual vehicle shaft rotation rate exceeds the target rate at a corresponding time on the target run curve, or whether the actual vehicle shaft rotation rate is below the target rate at a corresponding time on the target run curve. But first, the target run curve is created or otherwise identified according to the process 100 of FIG. 1.

The process 100 can be performed, in some implementations, using a software program running on a computing system, such as a tablet or laptop computer. The software may provide a graphical user interface (GUI) that is arranged to permit user interaction with the software through the GUI. The GUI can be used, for example, to identify and analyze vehicle run data 102a-d recorded from prior races, to facilitate identification and creation of a preliminary run curve, and to facilitate creation of the target run curve. The computing system may also include an interface that allows data to be loaded into the software from local or remote storage, and to transfer the target run curve, and data associated with the target run curve, to a vehicle controller for use in an actual race (e.g., another computing system or a portion of the computing system). The GUI can be presented on a computer monitor or other electronic display, such as a CRT monitor, an LCD monitor, or a touchscreen display.

Vehicle run data 102a-d recorded from one or more previous races can be imported or otherwise loaded into the software program. The data recorded from previous races may be data from actual previous races, from test runs of a vehicle on a race track, or from lab tests, for example. In some implementations, the data may be simulated data based on running a simulated race under particular conditions. The GUI of the software may allow a user to browse a local or remote file system to identify and select recorded data from one or more previous races to load into the software. In some implementations, the vehicle race data 102a-d can also be automatically detected, and may automatically be loaded by the software. For example, the software may be configured to automatically check certain file storage locations to identify whether any new run data is available. If new run data is found, a notification can be generated and presented to a user. The user can then select whether to load the data into the software so that the data can be operated on. Automatically detected data can also be automatically loaded into the software, even without explicit user selection that the data should be loaded.

Each set of vehicle run data 102a-d can be presented in the GUI in a manner that is convenient for the user to analyze and manipulate the data 102a-d. Individual icons or other graphical elements can be displayed within the GUI that each represent a corresponding set of vehicle run data 102a-d that has been loaded into the software. Run data 102a-d from multiple races (or other runs) can be presented separately from each other or together. For example, vehicle run data can be presented separately in respective window panes or regions of the GUI, or can be presented together by consolidating data in common window panes or regions of the GUI. Each set of vehicle run data 102a-d can be presented in one or more formats. In some implementations, a set of run data (e.g., 102a) can be presented in a tabular form in one or more tables that have rows and columns for displaying times of a race and corresponding vehicle shaft rotation rates for the times of the race, for example. In some implementations, a set of run data 102 can be plotted on a graph and presented within the GUI. In some implementations, several sets of vehicle run data 102a-d from multiple races may be consolidated and presented together, for example, by plotting data for each race together on a common graph. The user can select one or more controls in the GUI to cause particular sets of run data 102a-d to be added to the GUI for display or to be removed from display within the GUI.

Each set of vehicle run data 102a-d can include various forms of information about its corresponding race, including information about race conditions and vehicle performance. For one, vehicle run data 102 can include information about actual vehicle shaft rotation rates at particular times during a race. In some implementations, one or more sensors on a vehicle participating in a race (or other vehicle run) can repeatedly sense information corresponding to the current vehicle shaft rotation rate during the race. A computer on the vehicle can record the vehicle shaft rotation rates, and each recorded rotation rate may be associated with a particular time during the race, such as the time elapsed from the start of the race. The start of the race can be identified by a user trigger, such as an electrical signal produced as a result of a user pressing a button that frees the transmission brake to permit the vehicle to move forward. In some implementations, the vehicle shaft rotation rate may be recorded at short intervals, such as every 2-3 milliseconds. The interval at which rotation rates are sensed and recorded can be made as small as possible so as to obtain the greatest number of data points during a race. In some systems, a lower bound on the interval may be imposed by the configuration and design of the particular sensors that are used to measure the vehicle shaft rotation rate.

Vehicle shaft rotation rate may refer to information that characterizes angular motion of a component of the vehicle, such as of an axle, driveshaft, crankshaft, or wheel. The vehicle shaft rotation rate may refer to the rotation rate of a component within the drivetrain of the vehicle so that the rotation rate of one or more wheels of the vehicle correspond to the rotation rate of the drivetrain component (or a multiple thereof due to effects of a transmission). The vehicle shaft rotation rate may be an angular velocity or an angular acceleration, for example. In some implementations, the vehicle shaft rotation rate may be determined based on information sensed by a tachometer on the vehicle. For example, a magnetic tachometer may employ a hall-effect sensor located near a driveshaft that detects rotation of the driveshaft by sensing each time that one of a plurality of magnets spaced around a circumference of the driveshaft passes the sensor. The measured period of time that passes between sensing one of the spaced magnets and another of the spaced magnets can be used to determine the vehicle shaft rotation rate (e.g., a driveshaft RPM value). An optical sensor sensing optical markings or a mechanical sensor sensing mechanical markings can also be used, such as that described in U.S. Pat. No. 8,554,440 to Davis. Such techniques can similarly be used to determine axle RPMs or other vehicle shaft rotation rates. As noted, the vehicle shaft rotation rate can act as an indirect measure of the rate of rotation of one or more wheels on a vehicle. Therefore, the vehicle shaft rotation rate can indicate, at least indirectly, whether a vehicle's wheels are moving faster or slower than a target rotation rate for creating optimal traction between the tires and track surface during a race. In some implementations, wheel rotation rates can be directly measured, and the techniques described throughout this paper can be performed with reference to wheel rotation rates rather than vehicle shaft rotation rates.

The sets of vehicle run data 102a-d identified in the process 100 can also specify additional information about a vehicle or the conditions of a race beyond shaft or wheel rotation rates. The information may be included in a single file, or may be loaded from multiple files, such as if separate files were created for different measurements. Such information can indicate, at corresponding times over the course of a race, engine speeds, engine timing (ignition timing), vehicle temperatures, indications of the start and completion of a race, indications that certain vehicle components have been activated or de-activated, gear shifts and other transmission activity, indications of when brakes have been applied or released, indications of nitrous oxide or other gas injection, indications that turbocharging has been activated or de-activated, indications of tire temperature, indications of ride height (e.g., a distance between the ground and a portion of a body of the vehicle, such as an axel or the rear body housing), and measurements and direction of forces on the vehicle (e.g., g-forces on the vehicle and an orientation of the vehicle).

Run conditions (e.g., race conditions) can also be part of the vehicle run data 102. Information about run conditions can provide important context to vehicle operational data, because vehicles may operate significantly different in different conditions. Race condition information may indicate, for example, the type or length of the race (e.g., type of drag race), the type of vehicle that ran the race, the identity of the specific vehicle that ran the race, the type of or specific engine in the vehicle, the driver of the vehicle, the racetrack at which the race occurred, weather and environmental conditions (e.g., temperature, humidity, atmospheric pressure), track surface conditions, a date and time of day of the race, fuel type used in the race, and other information about how the vehicle was configured for the race (e.g., which tires were used during the race, tire tread condition, tire pressure, whether traction control was activated, and more). Some of the race data may be recorded based on information detected by sensors on the vehicle or otherwise present at the race, and some of the race data may be manually input by the user. The user may access, modify, add, and remove information from the race data through the GUI. The GUI may also provide a search function that can receive queries and respond with results of data for particular races that match the query. For example, a user may search for previous races that occurred in hot and humid conditions with a nitrous oxide engine, and races matching the criteria may be identified and presented to the user.

The user may interact with various components of the software's GUI to identify, analyze, and generally browse vehicle run data 102 for one or more races. One or more sets of run data 102 can then be selected as the basis for generating the preliminary run curve. In some implementations, the software may perform an automated analysis to select which set or sets of run data 102 will be used to create the preliminary run curve. For example, the software may select run data 102 for races whose data indicates the best performance according to one or more metrics (e.g., fastest race time, best engine performance, etc.). In some implementations, a user may specify parameters to guide the automated selection of races. As an example, a user may make selections in the GUI to indicate that he/she is only interested in creating a preliminary run curve based on races by a particular vehicle within a specific period of time. Therefore, the software may select only vehicle run data 102 for races that fit the criteria specified by the user. In some implementations, rather than an automated selection, the user may manually select one or more races for creation of the preliminary run curve.

When only a single set of vehicle run data 102 is selected, the run curve (e.g., the vehicle shaft rotation rate data) from the selected run can be directly used as the preliminary run curve. When multiple sets of vehicle run data 102 are selected, the run curves from each of the multiple corresponding runs can be merged to generate the preliminary run curve. For example, FIG. 1 shows that the vehicle run data 102*a* for test run #1 can be selected by itself, and used to directly generate the preliminary run curve 106*a*. The vehicle run data 102*b* for test run #2 was loaded into the software and analyzed by the user, but ultimately not selected for use in creating a preliminary run curve. And as an alternative to the single run selection, the right of FIG. 1 shows the vehicle run data 102*c* for test run #3 and the vehicle run data 102*d* for test run #4 are each selected to be used as a basis for generating the preliminary run curve 106*b*. The averaged run 104 is generated by averaging or otherwise merging the vehicle run data 102*c-d* of test runs #3 and #4, and the averaged run 104 can be used as the preliminary run curve 106*b*.

In some implementations, multiple sets of run data 102 can be merged by averaging the respective run curves for each of the races that are being merged. For example, measurements of vehicle shaft rotation rates from multiple runs can be merged by averaging the respective rates from each run at corresponding times of the runs. The races can be weighted equally or differently when generating the averaged run curve. Thus, at a corresponding time between two runs A and B, the averaged vehicle shaft rotation rate may be calculated as the weighted sum of the vehicle shaft rotation rates from each run at the corresponding time (e.g., 30-percent of the vehicle shaft rotation rate from race A at the corresponding time, plus 70-percent of the vehicle shaft rotation rate from race B at the corresponding time).

In some implementations, multiple run curves can be merged using a top-run averaging technique. With top-run averaging, for each corresponding time among a group of runs that are to be merged, the highest vehicle shaft rotation rate exhibited at the corresponding time from among all runs in the group of runs is selected as the vehicle shaft rotation rate for the corresponding time in the combined run curve. In some implementations, vehicle shaft rotation rates that are too high due to a loss of tire traction can be discarded when selecting the highest rotation rates at corresponding times in a group of runs, because one object of top-run averaging is to identify the maximum achievable vehicle shaft rotation rates at each moment during a race without causing the tires to experience unwanted or excess slipping. As an example of top-run averaging, consider, respectively, the run curves for two races A and B. During a first corresponding period of time during the race, the vehicle shaft rotation rate in race A is higher than the vehicle shaft rotation rate in race B. During a second corresponding period of time immediately following the first, the vehicle shaft rotation rate in race B exceeds that in race A. The top-run averaged curve of races A and B may therefore include a first segment for the first corresponding period of time in which the vehicle shaft rotation rate is equal to the vehicle shaft rotation rate in race A. Similarly, a second segment of the top-run averaged curve for the second corresponding period of time may have a vehicle shaft rotation rate equal to the vehicle shaft rotation rate in race B during the second corresponding period of time.

Figure 2:
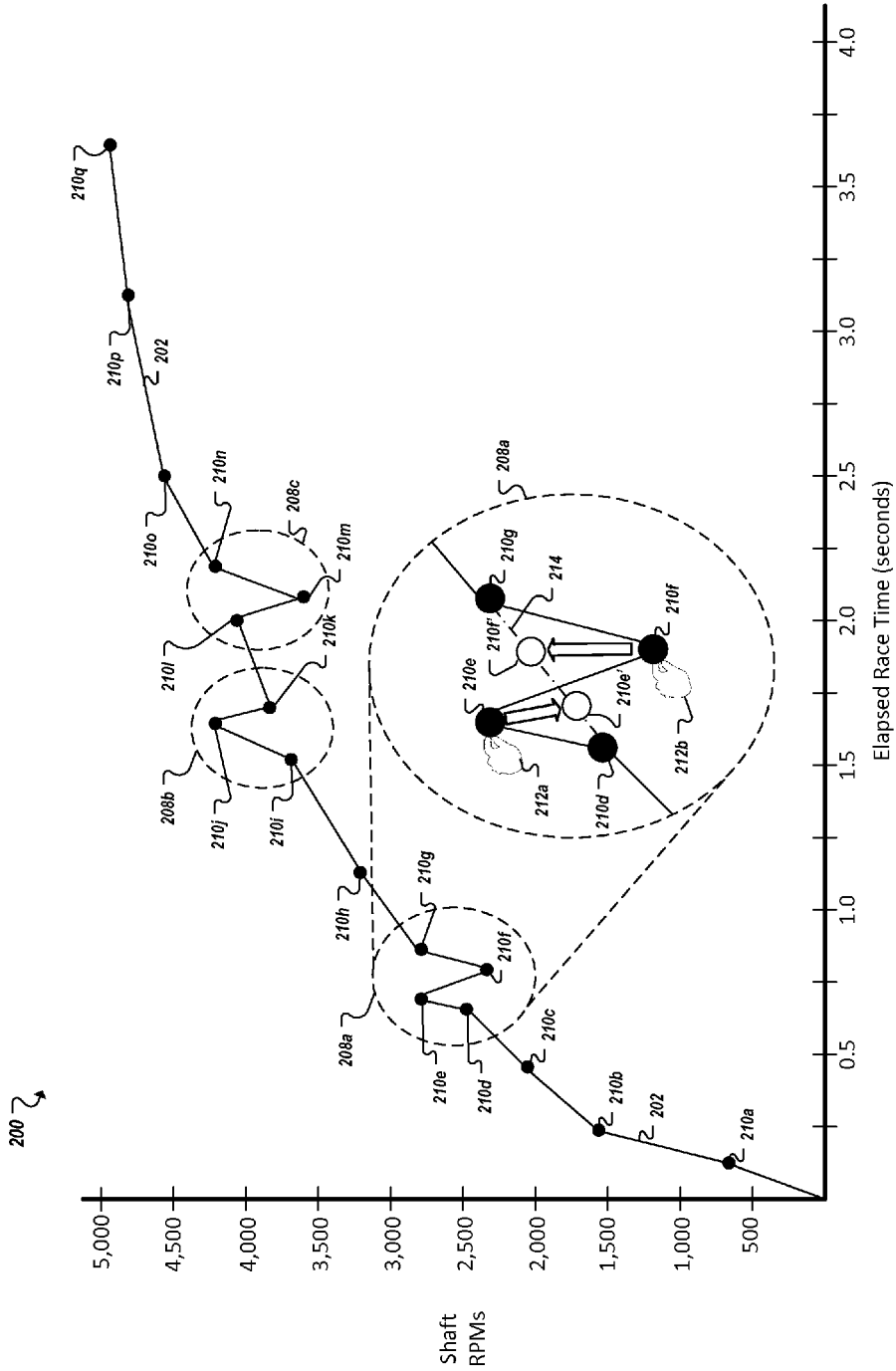
FIG. 2 shows a plot of an example preliminary run curve based on data selected from one or more previous runs, and shows manipulation of the preliminary run curve to generate a target run curve.

Turning to FIG. 2, a plot 200 is shown of an example preliminary run curve 202 based on data selected from one or more previous runs. The plot of FIG. 2 may be shown by the computing system described with respect to FIG. 1. The preliminary run curve 202 identifies a series of vehicle shaft rotation rates over a period of time during a race or other vehicle run. The preliminary run curve 202 may represent vehicle shaft rotation rates from a single race, if only one race was selected as the basis for creating a target run curve (such as preliminary run curve 106*a*). Alternatively, the preliminary run curve 202 may represent vehicle shaft rotation rates for a merged race based on data from multiple races that have been averaged together or otherwise combined (such as preliminary run curve 106*b*).

The plot 200 can be displayed within the software GUI. The plot 200 can be formatted based on default settings, user-selected settings, and/or based on other characteristics of the data for the selected race or races on which the preliminary run curve 202 is based. For example, the preliminary run curve 202 is plotted to show the vehicle shaft rotation rate in units of revolutions-per-minute (RPMs) as a function of the elapsed time of a race in seconds. In some implementations, the vehicle shaft rotation rate may be an axle, driveshaft, or crankshaft angular speed or acceleration, depending on which vehicle component's rotation rate was measured and recorded. In some implementations, the vehicle shaft rotation rate may be converted to a wheel rotation rate that indicates a rotational speed or acceleration of the wheels of a vehicle. In some cases, the vehicle shaft rotation rate may be equivalent to a wheel rotation rate, such as if the wheel is directly connected to the vehicle shaft and every one turn of the vehicle shaft corresponds to one turn of the wheel. In some cases, the wheel rotation rate may be derived from the vehicle shaft rotation rate based on a defined relationship between the wheel and vehicle shaft rotation rates, even if the wheel and vehicle shaft do not rotate at the same rates.

The plot 200 can be scaled, automatically or in response to user input, so as to show the entire preliminary run curve from the start of the race to the end of the race, or can be scaled to show only a portion of the race. In some cases, the vehicle run data represented by the preliminary run curve 202 may include data recorded before the start of a race and/or after the race had ended. Pre- and post-race data may be included and presented in the run curve 202, or may be excluded by cropping the run curve 202 at the start and end times of the race.

The plot 200 of the preliminary run curve 202 may include a series of discrete data points 210a-q that indicate respective vehicle shaft rotation rates at particular times during the race. The data points 210a-q may be shown in the plot 200 as graphical nodes (e.g., enlarged graphical elements located at particular points along the run curve 202). The number of data points 210 shown on the graph may vary. In some implementations, every recorded (or calculated) rotation rate for the preliminary run curve 202 may be shown. In this case, the data points 210 may be tightly spaced in the plot 200, since hundreds or thousands of data points 210 may be available over the duration of a race. In some implementations, a relatively smooth preliminary run curve 202 may be shown based on the data points 210, and larger graphical nodes may be spaced at regular intervals (e.g., every 0.25 seconds) on the preliminary run curve 202. The user may zoom in and out of the run curve 202 to view the curve 202 at different resolutions, and graphical nodes may be re-drawn and re-spaced at each zoom level.

The plot 200 of the preliminary run curve 202 may reveal instances where the vehicle exhibited undesirable performance (whether during an actual race or during a fictional race that is a merged representation of multiple races or other types of runs, for example). In some instances, one or more wheels may have lost traction with the track surface and begun spinning too fast. These events are represented in the preliminary run curve 202 by momentary spikes in the vehicle shaft rotation rate. In other instances, one or more wheels of the vehicle may have momentarily slowed relative to the overall or local trajectory of the preliminary run curve 202. Slowing is represented by depressions or valleys in the vehicle shaft rotation rate in the preliminary run curve 202, and might occur, for example, after traction is regained after wheel slippage, during a gear shift, when the vehicle hits a rough spot on the track, or when the driver releases the throttle too far. Both types of anomalous events—wheel spin resulting from lost traction and wheel slowing—are undesirable because the maximum power that could be delivered to propel the vehicle forward as quickly as possible is not achieved. Instead, the power is either too much (resulting in wheel spin or lost traction) or too little (resulting in unnecessary slowing).

The plot 200 of the preliminary run curve 202 shows three incidences of anomalous vehicle shaft rotation rates 208a-c. Each of the anomalous events 208a-c is identified by the dashed circles around corresponding portions of the preliminary run curve 202. The first anomalous event 208a begins with a spike in the vehicle shaft rotation rate, immediately followed by a dip in the vehicle shaft rotation rate. In practice, this type of event may occur when a wheel first loses traction, and then an over-correction is applied by reducing the power to the wheel more than what is necessary to regain traction. The second anomalous event 208b is a spike in the run curve 202 indicating a vehicle shaft rotation rate that is too high. The third anomalous event 208c is a dip in the run curve 202 indicating a vehicle shaft rotation rate that is too low—i.e., the vehicle shaft rotation rate may be increased without causing a loss of traction.

One object of presenting the preliminary run curve 202 in the GUI of the software is to construct a target run curve that can be used by a controller during an actual race to affect increases or decreases in the vehicle shaft rotation rate based on whether a measured vehicle shaft rotation rate is above or below a target rate at a corresponding time on the target run curve. To that end, adjustments can be applied to the preliminary run curve 202 to create the target run curve. The preliminary run curve 202 can be adjusted so that the target vehicle shaft rotation rate at all times during the course of an anticipated race is indicated by the target run curve.

In some implementations, the preliminary run curve 202 may be smoothed to form the target run curve. Smoothing can involve correcting incidences of anomalous vehicle shaft rotation rates. Overly-high vehicle shaft rotation rates can be corrected by lowering the spikes in the preliminary run curve 202, and overly low vehicle shaft rotation rates can be corrected by raising the dips in the preliminary run curve 202. In some implementations, the spikes and dips can be adjusted to smooth the run curve 202 so that the general trajectory of the run curve is maintained, as if the anomalous events had not occurred, from a time before the trajectory was disrupted by the anomalous event, to a time when the anomalous event is substantially completed.

The enlarged view of the first anomalous event 208a in FIG. 2 (shown under the preliminary run curve 202) shows one example of how the preliminary run curve 202 may be adjusted to form a target run curve. In some implementations, the preliminary run curve 202 can be manually manipulated by user input interacting with the plot 200 through the GUI. For example, the data points 210 may be gripped and dragged by user input to re-shape the curve 202. The enlarged view of the first anomalous event 208a shows a graphical pointing element 212a gripping (i.e., selecting) data point 210e and dragging the data point 210e down from its original location to a location on a corrected curve trajectory 214 (shown by re-located data point 210e'). Such adjustment can remove the spike from the preliminary run curve 202, so that the resulting target run curve may prevent the vehicle wheels from slipping undesirably when employed in an actual race. In a similar fashion, dips in the vehicle shaft rotation rate can be corrected, such as by gripping a data point 210f and moving it up to a higher rotation rate along the corrected curve trajectory 214 (shown by re-located data point 210f').

Generally, the user may grip any of the data points 210a-q along the preliminary run curve 202 to make localized adjustments around the gripped data point. In some implementations, manipulating a single data point (e.g., dragging the data point 210d up or down) can cause adjacent data points (e.g., data points 210c and e) to be adjusted in a corresponding fashion so as to maintain a smooth curve. For example, a user may grip only the highest data point 210d in a particular peak, and drag that highest data point 210 down to a lower vehicle shaft rotation rate. The software may then adjust neighboring data points to match the new trajectory indicated by the movement of the user-adjusted data point. In some implementations, a zoom control may be provided that allows the user to zoom in and out to view portions of the run curve 202 at different zoom levels. When zoomed-in, the user may more finely manipulate the run curve 202 than when zoomed-out. Data points that may be gripped and dragged can be presented at shorter time intervals in zoomed-in views as compared to zoomed-out views (e.g., the computing system may show data points that were not shown in the zoomed out view). In some implementations, the user can manually adjust values of data points by entering adjusted values in a spreadsheet or other table of values for the preliminary run curve 202.

The preliminary run curve 202 can also be analyzed by a computing system so that automated adjustments can be applied. In some implementations, the software may automatically determine corrections for the run curve 202, and may display the corrected curve trajectory 214 over the unaltered preliminary run curve 202. The user can then select whether to apply one or more suggested corrections to the run curve. In some implementations, the computing system may automatically identify anomalous events 208a-c in the run curve 202. The anomalous events may be visually distinguished on the run curve 202 from other portions on the run curve, such as by rendering the portions of the curve 202 that correspond to the identified anomalous events in bold or with a different color than colors used in other portions of the curve. A user may then select one or more of the anomalous events that have been identified by the computing system, and provide input through the GUI to indicate whether the selected events should be modified as suggested by the computing system.

Additional tools in the software may allow the user to adjust the run curve 202 in other ways, as well. For example, the user may apply a vehicle shaft rotation rate offset to the entire preliminary run curve 202 (or a portion of the curve 202) with a translation tool that moves the curve 202 straight up or down on the plot 200. A set of copy-and-paste tools may also allow portions of one race to be pasted into the run curve of another race. Once all of the adjustments to the preliminary run curve 202 have been made, the final result can be a target run curve that is usable to affect control of vehicle shaft rotation rates during an actual race.

Figure 3:
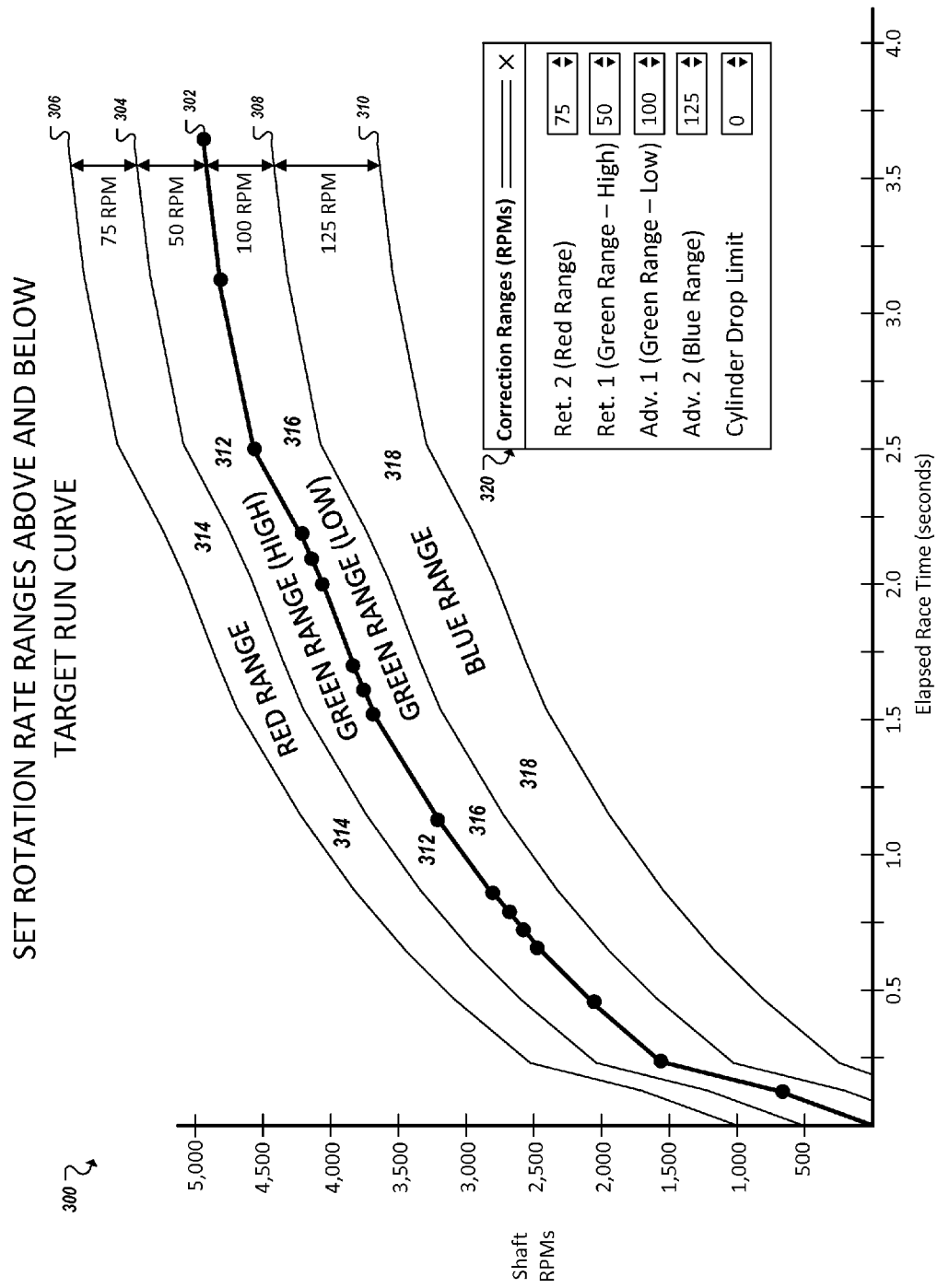
FIG. 3 shows an example plot of a target run curve with correction ranges defined on either side of the target run curve.

FIG. 3 shows an example plot 300 of a target run curve 302 with correction ranges shown on either side of the run curve 302. The plot 300 that is shown in FIG. 3 may be shown by the display of the computing system described with respect to FIGS. 1 and 2. The target run curve 302 may be generated as described above with respect to FIG. 2. For example, the target run curve 302 may be the result of a preliminary run curve 202 being identified or created based on selections of vehicle run data for one or more past races, and any modifications (e.g., smoothing) applied to the preliminary run curve 202. The target run curve 302 can be provided to a traction control unit on a vehicle, so that the traction control unit can affect increases or decreases in the vehicle shaft rotation rate during a race based on whether the actual vehicle shaft rotation rate is above or below the target run curve 302 at corresponding times on the target run curve 302. The amount of correction applied by the traction control unit to increase or decrease the vehicle shaft rotation rate can depend on how far the actual rotation rate strays from the target rate as indicated by the target run curve 302. For example, larger deviations between the actual vehicle shaft rotation rate and a target vehicle shaft rotation rate may require greater corrective action than smaller deviations.

In some implementations, the amount of correction to be applied when a difference is detected between the actual vehicle shaft rotation rate and a target vehicle shaft rotation rate can depend on a particular range of vehicle shaft rotation rates in which the actual rotation rate falls. Four ranges 312, 314, 316, 318 are shown in plot 300. In some implementations, correction ranges can be defined with respect to the target run curve 302. As such, the ranges may not have a constant value over an entire race. Instead, the upper and lower bounds of each range can depend on the value of the target run curve 302 at any point in time during the course of an anticipated race. This is illustrated in FIG. 3 by the four example ranges 312, 314, 316, 318 shown in plot 300. A high green range 312 is shown as a defined range of vehicle shaft rotation rates that exceed the target run curve 302 by 50 RPMs. A red range 314 is shown as a defined range of vehicle shaft rotation rates that exceed the high green range 312 by 75 RPMs (i.e., a range of vehicle shaft rotation rates that exceed the target run curve 302 by 50-125 RPMs). A low green range 316 is shown as a defined range of vehicle shaft rotation rates that fall below the target run curve 302 by not more than 100 RPMs. A blue range 318 is shown as a defined range of vehicle shaft rotation rates that fall below the low green range 316 by at least a 100 but not more than 125 RPMs (i.e., a range of vehicle shaft rotation rates that fall below the target run curve 302 by 100-225 RPMs).

The amount of correction that the traction control unit applies to bring the actual vehicle shaft rotation rate closer to the target rate specified by the target run curve 302 can differ based on which of the four ranges that the actual vehicle shaft rotation rate falls in. For example, a higher level of correction may be applied when the actual vehicle shaft rotation rate is in the red range 314 as compared to a level of correction applied when the actual vehicle shaft rotation rate is in the high green range 312. As described further below with respect to FIG. 4, the correction levels for each range may be specified by a user. In some implementations, the plot 300 includes three ranges on one or more sides of the target run curve 302. For example, the plot 300 may include, above the target run curve 302, a yellow range in between the red range and the green range. In some implementations, the plot 300 includes more than three ranges on any given side of the target run curve 302, such as four, five, six, or seven ranges on a side.

Users may interact with the GUI to configure the ranges and to set parameters associated with the ranges. In some implementations, the number of ranges can be set based on user input. The user may indicate how many ranges should be defined above the curve, below the curve, or both. The software may assign default labels (e.g., "red range," "blue range," "green range") to the ranges, which may be changed if desired by the user. In some implementations, the respective regions of the plot 300 corresponding to each of the ranges 312, 314, 316, 318 can be highlighted with different colors that correspond to an assigned color label. None, one, two, or more ranges may be defined above the target run curve 302, and none, one, two, or more ranges may be defined below the target run curve 302. The number of ranges above and below the target run curve 302 may be the same or different. The user may also define the width of each range (i.e., the boundaries of each range). In some implementations, the ranges may be specified in terms of an absolute width of the range. For example, the correction ranges window 320 from an example GUI includes controls that allow the width of each range 312-318 to be set using graphical controls that adjust the respective widths of each range. The user may also type the desired width of each range into text boxes that correspond to each range. In some implementations, the boundaries of each range may be defined in terms of each range's furthest distance from the target run curve 302. For example, the upper bound of the high green range 312 may be specified as 50 RPMs above the target run curve 302, and the upper bound of the red range 314 may be specified as 125 RPMs above the target run curve 302. The lower bound of the lower green range 316 may be specified as 100 RPMs below the target run curve 302, and the lower bound of the blue range 318 may be specified as 225 RPMs below the target run curve 302.

In some implementations, when the range widths are defined in terms of their furthest distances from the target run curve 302, the order of the ranges may be determined based on the values for each range. Thus, if the high green range 312 was assigned an upper limit of 100 RPMs over the target run curve 302, and the red range 314 was assigned an upper limit of 75 RPMs over the target run curve 302, then the order of the high green range 312 and the red range 314 may be reversed from what is shown in FIG. 3. In this case, the red range 314 would be located closest to the target run curve 302, and the high green range 312 would extend above the red range 314 from 75 RPMs to 100 RPMs. In some implementations, the order of the ranges may be predetermined, and the software may enforce range limits that ensure the order is respected. For example, the high green range 312 may always be assigned the first position closest to the target run curve 302. The user may then be prevented from inputting range boundaries that would cause the red range 314 to be assigned the first position closest to the target run curve 302 rather than the high green range 312.

The user does not always need to specify the range boundaries. In some implementations, default range boundaries may be applied, which the user may accept or change. Ranges may also be removed or added after a default number of ranges are initially created. In some implementations, different default settings may be applied based on other parameters known about the race or the vehicle for which the target run curve 302 is being created. For example, a vehicle with a first engine configuration may be associated with wider default ranges, whereas a vehicle with a different, second engine configuration may be associated with narrower default ranges.

In some implementations, a neutral range can be defined directly above, below, or straddling the target run curve 302. When the actual vehicle shaft rotation rate falls within the neutral range, no action is taken to affect the vehicle shaft rotation rate even though the actual rate may not exactly match the rate specified by the target run curve 302. The neutral range can thus provide a buffer around the target run curve 302 that permits small deviations from the target rotation rates without taking corrective action. A user may select in the GUI whether to apply a neutral range, and if a neutral range is selected to be applied, whether the neutral range should apply above the target run curve 302, below the target run curve 302, or both. Boundaries of the neutral range may also be selected by default or by user input. In some implementations, the neutral range may be a distinct type of range from other ranges. For example, the neutral range may be arranged closest to the target run curve 302 before the green ranges 312, 316. In some implementations, either or both of the high green range 312 and low green range 316 may be configured as neutral ranges themselves by setting their respective correction levels to zero.

In some implementations, rather than a range-based correction scheme as has been described in the preceding paragraphs, the determination of whether and how much to affect a vehicle shaft rotation rate can be based on a non-range based function of the difference between the actual vehicle shaft rotation rate and the target rate specified by the target run curve 302. For example, the user may set a corrective function by setting a maximum level for the corrective action at, say, 100 RPMs above the target run curve 302. Applying the corrective function, fifty percent of the maximum level of corrective action may then be taken when the actual vehicle shaft rotation rate is 50 RPMs above the target run curve 302; twenty-five percent of the maximum level of correction action may be taken when the actual vehicle shaft rotation rate is 25 RPMs above the target run curve 302. In other words, the amount of distance or the proportion that an actual vehicle shaft rotation rate extends into a user-specified range or towards a user-specified rotation rate may be used to select a proportion of a user-specified level of corrective action that corresponds to that user-specified range or user-specified rotation rate. The amount of correction to apply may be linearly-proportional to the difference between the actual vehicle shaft rotation rate and the target rate, or may be non-linear.

Turning to FIGS. 4A and 4B, a screenshot 402 is shown (FIG. 4A) of an example GUI for setting time zones and correction levels in terms of ignition timing offsets, and a plot 404 is shown (FIG. 4B) of the target run curve 302 segmented into three time zones over the duration of an anticipated race. The GUI may be displayed by the computing system described with respect to FIGS. 1-3.

One or more time zones can be configured so that different parameters can be assigned to different portions of an anticipated race. At a minimum, one zone can be defined that spans the entire anticipated race from beginning to end (e.g., as illustrated in FIG. 3). In this case, the same set of parameters may be applied throughout a race. However, additional zones may also be defined so that the parameters need not be uniform during the entire race. Each time zone can be associated with its own set of parameters. When multiple zones are defined and utilized, the traction control unit in the vehicle can determine how to respond to detected differences between an actual vehicle shaft rotation rate and a target vehicle shaft rotation rate based on zone-specific parameters. For example, more corrective action may be taken at the start of a race for a given difference in the actual and target vehicle shaft rotation rates than the level of corrective action that would be taken at the end of the race for the same difference in the actual and target vehicle shaft rotation rates.

The screenshot 402 includes three boxes 406, 408, 410 in which users may set respective parameters for each of three time zones 412, 414, 416. The number of time zones may be specified by a user, or a default number of time zones may be created. After an initial number of time zones is specified (either by a user or by default), the number of time zones may be adjusted by adding or deleting additional time zones. The parameters shown in the boxes 406, 408, 410 for each of the time zones 412, 414, 416 include the length of each time zone, and the correction levels that should be applied for each of the defined ranges in each time zone. Other parameters may also be set, which are not shown in FIG. 4A. For example, time zone-specific ranges may be defined. Thus, time zone 1 (412) may include no red range 314, whereas time zones 2 and 3 (414 and 416) may include the red range 314. Similarly, the range boundaries may differ between time zones. For example, the blue range 318 may have a width of 125 RPMs in zone 2 (414), but may have a narrower width of 80 RPMs in zone 3 (416) (not shown).

The length of each time zone 412-416 (i.e., the portion of the anticipated race covered by each time zone) may be set by specifying a start time, a stop time, or both start and stop times, for each time zone 412-416. The screenshot 402 shows a "Time Range" input field in which the user can enter a stop time in the anticipated race for the end of each time zone 412-416. For example, the first time zone 412 can automatically begin at the start of the anticipated race (0.00 seconds). The end of the first time zone 412 is set in the shown example at 1.00 seconds. Based on the first time zone 412 ending at 1.00 seconds, the second time zone 414 that immediately follows the first time zone 412 can be automatically set to start at 1.00 seconds into the race. Similarly, based on the second time zone 414 ending at 2.50 seconds, the third time zone 416 that immediately follows the second time zone 414 can be automatically set to start at 2.50 seconds. The third time zone 416 is set to end at the end of the race. In some implementations, the length of a time zone may be specified in terms of its absolute length (e.g., in seconds), rather than by specifying the exact start and end times of the time zones.

In some implementations, a user may interact with a presentation of the plot 404 in the GUI to configure time zones. Time zones may be created or removed by adding or deleting vertical time zone bars 418, 420 over the plot 404 of the target run curve 302. For example, vertical bar 418 divides time zone 1 (412) and time zone 2 (414). Vertical bar 420 divides time zone 2 (414) and time zone 3 (416). The vertical bars 418 and 420 may be selected and dragged horizontally to adjust the ranges of each time zone. For example, although vertical bar 418 is shown as dividing time zone 1 (412) and time zone 2 (414) at 1.0 seconds into the anticipated race, the vertical bar 418 may be dragged to the right to increase the length of time zone 1 (412), or may be dragged to the left to shorten time zone 1 (412).

Each box 406, 408, 410 in the screenshot 402 of the GUI also provides controls for setting and adjusting correction levels for each defined range of rotation rates in the respective time zones. Because the correction levels for any of the ranges may differ in each of the time zones 412, 414, 416, each box 406, 408, 410 includes respective input fields corresponding to the high green range 312, red range 314, low green range 316, and blue range 318.

Generally, the correction level assigned to a given correction range (defined range of rotation rates) identifies a level of corrective action that is to be taken by one or more components of a vehicle so as to affect a vehicle shaft rotation rate. Higher correction levels may affect a larger change in the vehicle shaft rotation rate than lower correction levels, and higher correction levels may change the vehicle shaft rotation rate more quickly than lower correction levels. Similarly, lower correction levels may affect less of a change in the vehicle shaft rotation rate than higher correction levels, and lower correction levels may change the vehicle shaft rotation rate more slowly than higher correction levels.

Corrections to the vehicle shaft rotation rate can be applied by way of one or more types of corrective actions. Moreover, different types of corrective actions may be configured with different parameters for setting correction levels. As such, the particular set of input controls presented within the GUI for setting the correction levels of the defined ranges may depend on which types of corrective actions are to be applied. For example, one type of corrective action that may be applied is ignition timing adjustments (also referred to as engine timing adjustments). As described below, correction levels for ignition timing adjustments can be entered in units of degrees. The screenshot 402 shows such correction levels for ignition timing adjustments being specified in degrees. Each defined range of rotation rates is assigned a degree value that indicates the amount of ignition timing adjustment to be applied in the respective range.

In some implementations, multiple types of corrective actions may be available on a vehicle to affect a change in the vehicle shaft rotation rate. A controller may determine how to apply combinations of one, some, or all of the available types of corrective actions to apply during a race. When multiple types of corrective actions are available, respective sets of input elements for each available corrective action may be presented in the GUI for setting the particular parameters associated with each type of corrective action. For example, a first set of parameters is shown in boxes 406, 408, 410 for setting correction levels in terms of degrees for ignition timing adjustments. If a second type of corrective action was also available, then input elements identifying the second set of parameters for setting the correction levels for the second type of correction action may also be displayed in the boxes 406, 408, 410 below the ignition timing adjustment parameters, for example.

In some implementations, when multiple types of corrective actions are available, a user may select which of the available types of corrective actions (e.g., less than all of the available types of corrective actions) to apply during a race. In some implementations, the user may input just a single, master value to indicate the correction level for a particular range of rotation rates within a time zone, even where multiple types of corrective actions are available and are to be applied. The single, master correction level value can then be automatically converted by the computing system to respective sets of parameters for each of the multiple types of corrective actions. For example, the user may enter a single, master correction level value in the range 0-100. The single value entered by the user may then be automatically converted to respective parameters for both an ignition timing adjustment (first type of corrective action) and for a fuel/air ratio adjustment (second type of corrective action).

One type of corrective action that has been noted is ignition timing adjustments. Ignition timing adjustments can increase or decrease the amount of power output by the engine of a vehicle, thereby causing an acceleration or slowing of the vehicle shaft rotation rate. Ignition timing generally refers to the time at which a spark is energized in the cycle of a spark ignition internal combustion engine. An ignition control system can electronically control the time at which sparks are energized during the engine cycle. Sparks are generally timed to occur in the combustion chamber of an engine near the end of the compression stroke in order to generate combustion that forces the combustion chamber to expand during the power stroke. When the engine transitions from the compression stroke to the power stroke, and thus when the combustion chamber is at its smallest volume, the engine (e.g., a particular cylinder/piston of the engine) is at a position known as top dead center. Some engines advance the timing of the spark so that the spark is energized before the engine reaches top dead center, toward the end of the compression stroke, to more effectively generate power than if the spark was energized at top dead center. Ignition timing can be expressed in terms of a crankshaft angle advanced before top dead center (e.g., a rotational offset of the crankshaft with respect to its location when the combustion chamber is at its smallest volume), or as a crankshaft angle retarded after top dead center if the spark timing is delayed until some time during the power stroke.

When ignition timing adjustment is used as a corrective action, the parameter for setting the correction level for each defined range of rotation rates can be expressed in terms of a crankshaft angle. In some implementations, the crankshaft angle can be specified in degrees before top dead center (degrees bTDC) at which the spark is fired. In some implementations, the user may enter an absolute crankshaft angle. The absolute crankshaft angle is the actual angle of the crankshaft at which the spark is set to fire, such as 15 degrees bTDC. In some implementations, the user may enter a crankshaft angle offset (i.e., an engine/ignition timing offset). Rather than being the actual angle of the crankshaft at which the spark is set to fire, the offset value identifies how much the crankshaft angle at which the spark fires should be changed from the crankshaft angle that would otherwise be set in the absence of an ignition timing adjustment. For example, consider an engine that is nominally configured to spark at 15 degrees bTDC without ignition timing adjustments. The ignition timing may be advanced to 17 degrees bTDC when a +2 degree timing offset is applied, or may be retarded to 13 degrees bTDC when a −2 degree timing offset is applied. Thus, ignition timing may be advanced by adding degrees bTDC, and may be retarded by subtracting degrees bTDC. In some implementations, ignition timing can be advanced during a race when the actual vehicle shaft rotation rate is determined to have fallen below a target rotation rate indicated by the target run curve 302. Ignition timing can be retarded during a race when the actual vehicle shaft rotation rate is determined to be greater than a target rotation rate indicated by the target run curve 302. Different timing adjustments can be assigned to different ranges of rotation rates, so that, for example, greater adjustments may be made as the actual vehicle shaft rotation rate drifts further away from the target vehicle shaft rotation rate. As an example, the screenshot 402 shows respective ignition timing offset values in degrees bTDC for each of the ranges 312, 314, 316, 318 and in each of the three time zones 412, 414, 416. For instance, when the actual vehicle shaft rotation rate falls in the red range 314 in zone 1 (412), the ignition timing is set to be retarded by 2 degrees from a baseline timing (e.g., retard from 15 degrees bTDC to 13 degrees bTDC). When the actual vehicle shaft rotation rate falls in the blue range 318 in zone 3 (416), the ignition timing is set to be advanced by 1 degree from a baseline timing (e.g., advance from 15 degrees bTDC to 16 degrees bTDC).

In some implementations, the ignition timing modification can include adjusting the temperature of a glow plug for a diesel engine (e.g., by increasing the current applied to the glow plug). Increasing the temperature can cause the air/fuel mixture to ignite earlier than with a lower temperature glow plug.

In some implementations, ramp limit values can also be specified that limit how quickly an ignition timing adjustment can be affected. Ramp limits may thus limit the rate at which ignition timing is changed from a first setting to a second setting. For example, consider a scenario where during a race, ignition timing is initially configured at a baseline value of 12 degrees bTDC. However, the vehicle's tires begin to excessively slip and the vehicle shaft rotation rate rapidly rises to the red range 314 above the target vehicle shaft rotation rate of target run curve 302. The correction level for the red range 314 at the time the slipping occurs may be a retarding timing adjustment of 5 degrees bTDC, so that the actual ignition timing is to be retarded to 7 degrees bTDC. Instantly retarding the timing from 12 degrees bTDC to 7 degrees bTDC may not be desirable because the instant shift may reduce engine performance, may cause knocking (pinging), and may even cause damage to the engine. Therefore, the ignition controller may gradually adjust ignition timing over several engine cycles at a rate that does not exceed the ramp limit value. Ramp limit values may be set by default, or may be entered by the user through the GUI. In some implementations, ramp limits can differ when transitioning between different ranges, and ramp limits may also differ in different time zones 412, 414, 416 of the race.

In some implementations, ramp limits may be applied between different zones in order to limit a change in ignition timing that be specified as the system transitions from one zone to another. As an illustration described with respect to FIG. 3, suppose that the actual vehicle shaft rotation rate exceeded the target run curve 302, so that the actual vehicle shaft rotation rate was in the "Red Range." Suppose that this rotation rate occurred while the race was in Zone 1 (e.g., because the elapsed race time was at 0.95 second). As illustrated by FIGS. 4A and 4B, the Zone 1 user settings specify that a 2 degree ignition timing offset should be applied. As the race continues past 1 second (and thus transitions from Zone 1 to Zone 2), the actual vehicle shaft rotation rate may remain in the Red Range, and thus the computing system may determine that the ignition timing offset is to change from 2 degrees to 3 degrees. A sudden change of 1 degree offset may affect engine performance, as discussed above. Therefore, the system may limit the change in ignition timing that results from a zone transition based on a pre-set limit of degrees of change per unit of time, just as with the user-configurable ramp limits for transitions within a zone (e.g., no more than 0.1 degree change in ignition timing per 0.1 seconds or per engine cycle).

The ramp limits between zones may be specified by user input, and may be specific to each zone transition (but generic to all ranges in that zone transition), such that plot 404 in FIG. 4B would have two ramp limits (one for the transition between Zone 1 and Zone 2, and one for the transition between Zone 2 and Zone 3). The user-customizable ramp limit may also be specific to each range for each zone transition, such that the plot 404 in FIG. 4B would have eight ramp limits (one for the Red Range transition from Zone 1 to Zone 2, one for the Red Range transition from Zone 2 to Zone 3, one for the Blue Range transition from Zone 1 to Zone 2, etc.). The system may allow a user to customize the ramp limits within each zone as well. In some implementations, the system applies a global ramp limit that may or may not be user specified. The global ramp limit may specify that the ignition timing offset cannot change more than an amount specified by the global ramp limit, regardless whether the transition is the result of switching ranges, zones, or both.

In some implementations, an ignition timing controller may detect ignition timing adjustments based on an electrical control signal that indicates the amount of timing adjustment to be applied. For example, an analog voltage in the range 0-7 volts may be provided by the traction control unit in the vehicle as input to the ignition timing controller of the vehicle. The voltage level of the control signal may be linearly related to the timing adjustment affected by the controller (e.g., every 1 volt difference from a 3.5 volt center value causes 3 degrees of advancement or retard). In this manner, an analog voltage level corresponding to a desired ignition timing can be provided to the ignition timing controller in order to apply a desired level of ignition timing adjustments. In some implementations, the traction control unit provides a digital value to the ignition timing controller, where the digital value identifies the desired timing adjustment. In some implementations, the traction control unit directly controls the ignition timing of the engine (e.g., such that there is no intermediary ignition timing controller that controls ignition timing).

Other types of corrective actions that may be applied, rather than or in addition to ignition timing adjustments, include increasing or decreasing (sometimes described simply as "modifying" or "adjusting," below) the amount of fuel injected into the combustion chambers of the engine for one or more engine cycles to increase or decrease engine power; increasing or decreasing the amount of air (or other combustible gas such as nitrous oxide) injected into the combustion chambers of the engine for one or more engine cycles to respectively increase or decrease engine power; adjusting the ratio of fuel and air injected into the combustion chambers of the engine for one or more engine cycles, which can be performed in some examples by injecting water or methanol into the engine cylinders; requesting a partial or full release of the clutch; activating/deactivating a turbocharger or blower to increase or decrease boost; adjusting a level of turbocharging; increasing or decreasing the number of cylinders firing (e.g., whether or not a spark plug is ignited for certain cylinders and/or whether or not fuel is fed into such cylinders) to respectively increase or decrease engine power; modifying the converter charge pressure, for example, by bleeding off pressure; and engaging or disengaging one or more brakes of the vehicle. In some examples, corrective actions can include advancing or retarding the intake and exhaust valve timing. For example, advancing intake and exhaust valve timing with regard to a default valve timing can increase the amount of power at low RPMs, while retarding valve timing can decrease the amount of power at low RPMs. On the other hand, retarding intake and exhaust valve timing can increase power at high RPMs, while advancing intake and exhaust valve timing can decrease power at high RPMs. In some examples, corrective action can include varying the power applied to one or more electric motors (e.g., motors that directly or indirectly power the driven wheels), for example, by increasing or decreasing the voltage, current, or combination of voltage and current supplied to the one or more electric motors. Various corrective actions may be coordinated and applied in any sequence and combination. For example, one type of corrective action may be used to increase the torque applied to the driven wheels (e.g., advancing ignition timing or increasing nitrous or boost), while another type of corrective action may be used to decrease the torque applied to the driven wheels (e.g., dropping cylinders or braking or bleeding converter charge pressure).

In general, the corrective actions can affect the power that is applied to the driven wheels, and users may able to specify various levels of each corrective action for each range and zone, as shown in boxes 406, 408, and 410 of FIG. 4A. These corrective actions may be applied as a result of the system determining that the actual rate of rotation of a vehicle shaft has entered one of the ranges specified in FIG. 4A, but can also be applied to traction control processes which may operate independent of whether the rate of rotation is within one of the specified ranges (discussed later in this disclosure).

With regard to decreasing the number of cylinders, the system that analyzes and modifies the rate of rotation of the vehicle shaft can "drop" one or more cylinders to reduce engine power and limit the rate of rotation of the vehicle shaft. The system can enact different levels of power reduction by dropping one or more cylinders during a single series of strokes. (A four-stroke engine generates a series of four strokes that requires two revolutions of the engine crankshaft to perform two up-and-down actuations of each cylinder, while a two-stroke engine generates a series of two strokes during a single revolution of the engine crankshaft). As such, an eight cylinder engine could have at least five different levels of power reduction, in which one, two, three, or four cylinders are dropped during a given series of engine strokes.

In the user interface of FIG. 4A, a user is able to specify with the Cylinder Drop Limit user interface element in each of zones 1, 2, and 3, the maximum number of cylinders that the computing system is able to drop for the respective zone. In some implementations, the Cylinder Drop Limit is able to be specified in addition to the ignition timing offsets and may serve as a sort of last resort to limit power provided to the driven wheels when the actual rate of rotation moves to the far edge of the Red Range and the ignition timing offsets are not having their intended affect. For example, should a user specify a Cylinder Drop Limit of "2", the system may drop a single cylinder once the actual rate of rotation passes 60% through the Red Range, and may drop a second cylinder once the actual rate of rotation passes 80% through the Red Range. The cylinders may be reactivated once the actual rate of rotation falls back to 60% or 80% respectively, although different resumption mechanisms may be employed. Cylinders may be dropped in other ranges as well. For example, with a Cylinder Drop Limit of "4", one cylinder may be dropped at 80% through the Green Range—High, and the second, third, and fourth cylinders may be dropped at various stages through the Red Range.

In some implementations, a user is able to specify a cylinder drop limit for a particular range instead of or in addition to an ignition timing offset. For example, a user may specify that one cylinder be dropped if the actual rate of rotation is in the Green Range—High, and that three cylinders be dropped if the actual rate of rotation is in the Red Range. The user may specify that cylinders be dropped for a range instead of having the ignition timing change for the range, although the user may be able to specify ignition timing offsets that would supplement the dropping of cylinders for each range. In other words, a user may specify that ignition timing retarding and cylinder dropping work separately or in conjunction to limit the amount of power provided by the engine.

In some implementations, a cylinder is dropped by inhibiting the firing of the spark plug for an individual cylinder and also preventing the introduction of a fuel/air mixture into that cylinder. In other implementations, the firing of the spark plug may be inhibited, but the fuel/air mixture may still be introduced into the cylinder. In such a situation, most of the unburned fuel and air may pass into the exhaust manifold on the exhaust stroke of the cylinder, although some unburned fuel and air may remain in the cylinder. This unburned fuel in the cylinder may affect the ratio of fuel to air when normal operation is resumed, and the unburned fuel in the exhaust manifold may ignite or may cause undesirable changes in temperature, even if it remains unburned. For these reasons, the system can prevent the same cylinder from being dropped on two subsequent compression strokes (e.g., on two consecutive series of strokes of the engine), and can therefore modify which cylinders are dropped each series of cylinder strokes, which can ensure that each cylinder receives an ignition spark on one out of every two compression strokes. Doing so helps clear individual cylinders and exhaust manifold ports of unburned fuel, preventing a buildup that could lead to the conditions described above, and which can allow the engine to return to normal operation more quickly when ignition resumes.

Once the system has identified a number of cylinders to drop or inhibit, the system can turn off the cylinders according to pre-determined patterns to prevent a same cylinder from being dropped twice in a row. The patterns may maximize the amount of compression strokes between each cylinder being dropped. As described above, the system may apply other types of corrective actions to limit the amount of power applied to the driven wheels.

FIGS. 5A and 5B show, respectively, plots of ignition timing and vehicle shaft rotation rates for the duration of an example race. The actual vehicle shaft rotation rates (e.g., driveshaft RPMs) measured during the race are represented by the thick solid line 506 in FIG. 5B. The target run curve 302 is shown in FIG. 5B by the dashed line 302. As shown in the figure, the actual vehicle shaft rotation rates generally track the target run curve 302. But in a number of periods during the race, the actual vehicle shaft rotation rate exceeded the corresponding rates of the target run curve 302, which may indicate that unwanted tire slipping has occurred. In other periods of the race, the actual vehicle shaft rotation rate fell below the corresponding rates of the target run curve 304, which may indicate that wheel speed may be increased without causing unwanted slipping. This example race was run with an ignition timing controller that adjusted engine timing when differences were detected between the actual vehicle shaft rotation rates and the corresponding target rates of the target run curve 302. FIG. 5A shows a plot 502 of the ignition timing adjustment (in terms of offset from a baseline timing in degrees bTDC) for the duration of the race. The timing adjustments are represented by the line 508, and the particular adjustments that were applied are based on the settings shown in FIG. 4A.

From the start of the race to time $t_1$, the actual vehicle shaft rotation rate 506 closely tracks the target run curve 302. At time $t_1$, the actual vehicle shaft rotation rate 506 quickly rises above the corresponding rates of the target run curve 302 and enters the red range 314. Accordingly, the ignition timing controller retards the ignition timing by 2 degrees, as shown by the plot 502 in FIG. 5A (and as specified in the zone settings box 406, see FIG. 4B). The ignition timing change may immediately change 2 degrees or may be gradual rather than instantaneous so that the timing is not changed faster than what is allowed by applicable ramp limits. Such gradual change is shown by the non-vertical slope in the ignition timing line 508 from $t_1$, when the timing adjustment begins to occur, until the ignition timing offset reaches 2 degrees retardation. Gradual timing changes are shown throughout the plot 502 of the ignition timing during the race whenever a timing change is made.

As a result of the retarded ignition timing being initiated at time $t_1$, the actual vehicle shaft rotation rate 506 corrects trajectory and begins converging again with the target run curve 302. As the vehicle shaft rotation rate 506 gets closer to the target run curve 302, the actual rotation rate 506 crosses into the high green range 312 at time $t_2$. In response, the ignition timing offset is advanced by 1.5 degrees to a net offset of just 0.5 degrees retarded. When the actual rotation rate 506 again aligns with the target run curve 302, the ignition timing offset is reduced to zero, at time $t_3$. For a period of time from $t_3$ to $t_4$, the ignition timing offset remains at zero. But at $t_4$, the actual vehicle shaft rotation rates 506 begins to fall below the corresponding rates of the target run curve 302. In response, the traction control unit in the vehicle advances the ignition timing offset by 0.5 degrees— the assigned correction level for the low green range 316 in time zone 1 (412). An over-correction of the vehicle shaft rotation rate 506 occurs at time $t_5$, and the ignition timing is retarded accordingly. Further changes to the ignition timing are made at each following instance of time at $t_6$-$t_{13}$ shown in FIGS. 5A and 5B. Different timing adjustments are made in different time zones 412, 414, 416 based on the assigned correction levels that are applicable in each time zone. For example, whereas timing was advanced by 0.5 degrees in the low green range 316 between times $t_4$ and $t_5$ in zone 1 (412), in contrast timing is advanced by a full 1 degree when the actual vehicle shaft rotation rate 506 falls in the low green range 316 between times $t_8$ and $t_9$ in zone 2 (414).

In some implementations, a refined target run curve can be generated by smoothing (as described with respect to FIG. 2) the plot of the actual vehicle shaft rotation rates 506 from a previous race in which ignition timing adjustments and/or other types of corrective actions were applied. The smoothed curve can then act as a new target run curve to use in a subsequent race. The plot of the actual vehicle shaft rotation rate from the subsequent race can then be smoothed again as a result of user input on a computing system (e.g., a tablet or laptop), and used as the target run curve in a second subsequent race. These operations can be repeated a number of times through a number of iterations to generate a progressively refined target run curve after each iteration. Eventually, the target run curve may be refined to the extent that an ideal race may be run based on pre-programmed ignition timing adjustments that do not rely on feedback from measured vehicle shaft rotation rates. In such an automated race, the necessary timing adjustments and other corrective action are anticipated based on prior run data. In some implementations, feedback from measured vehicle shaft rotation rates may still be used, however, in case the actual race differs from the prior run data in any significant respect so that corrective action may be taken, even if not anticipated.

Limiting Engine Revolutions Per Minute

Figure 6:
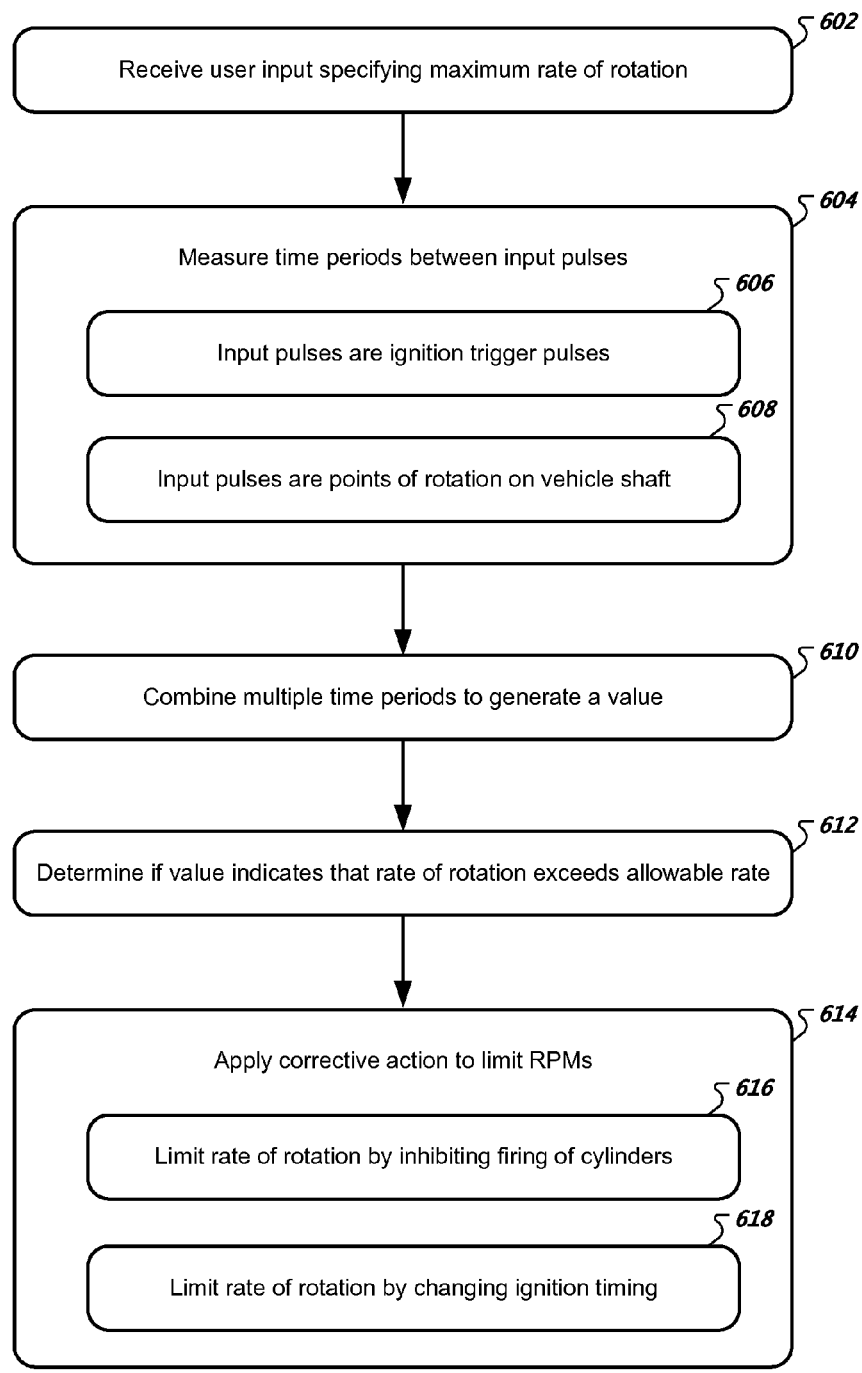
FIG. 6 shows a flowchart of a process for limiting shaft rate of rotation.

The computing system discussed in this document can also limit the rate of rotation (e.g., the RPMs) of a rotating shaft of the vehicle (e.g., any of the rotating shafts discussed herein, such as the engine crankshaft) in order to prevent damage to the engine or other components of the engine. A process for limiting the shaft rate of rotation is discussed below with respect to FIG. 6.

At box 602, the computing system receives user input that specifies the maximum rate of rotation. For example, a user may type an RPM limit into a user interface of the computing system (e.g., to specify a 9000 RPM limit for the engine). A user may also select graphical interface elements to adjust a displayed maximum RPM value (e.g., by selecting up and down arrows to change a displayed number from 8000 to 9000). In some implementations, the user input specifies or identifies another value from which the rate of rotation may be determined (e.g., a limit of "A", "B", "C", or "D", where each number corresponds to a different limit to the rate of rotation).

At box 604, the computing system measures time periods between input pulses. The input pulses may occur as the vehicle shaft rotates and may indicate that one of multiple points of rotation on the rotating shaft passed a sensor. For example, there may be six evenly-spaced points of rotation on a rotating vehicle shaft that a sensor can detect when they pass the sensor. Stated another say, the system may measure the time period between when a pulse is received and when a second pulse is received. The time period may be inversely correlated to the speed of the engine, and a single time period (or multiple time periods) can be used to determine if the engine is rotating too quickly.

In one example, the input pulses are ignition trigger pulses (box 606). Ignition trigger pulses may be electrical signals or other signals that are triggered by rotation of a crankshaft or another engine shaft, and that indicate that the cylinders are at or near certain positions (e.g., a position at which a spark plug is to ignite). As an illustration, should a vehicle crankshaft begin to rotate at an excessive rate of rotation (e.g., due to the tires loosing traction with the ground), the engine would generate its ignition trigger pulses at an increasing rate. The computing system may measure the time periods between these pulses (e.g., the time period from the receipt of one pulse to the receipt of an immediately subsequent pulse). In some vehicles, the ignition trigger pulses are received each one-quarter revolution of the crankshaft.

In other example, the input pulses are points of rotation on a rotating vehicle shaft (box 608). For example, the crankshaft or another shaft of the vehicle (e.g., the camshaft, an axle, a rotating portion of the transmission, the driveshaft, etc.) may include points on the rotating shaft that a sensor is able to sense, as each point rotates past the sensor. The sensor may be located on a portion of the vehicle that is fixed with regard to a position of the rotating shaft. In some implementations, the sensor may be located on the rotating vehicle shaft and the points of rotation may be located around the rotating shaft and fixed with regard to the position of the rotating shaft.

The computing system may continuously or regularly combine the most recent N (e.g., any of 2 through 100) time periods to generate a new value. In other words, the computing system may generate a rolling average or rolling combination of recent time periods, which may allow the system to act more quickly than if a rolling combination was not used and distinct batches of numbers were combined. For example, the system may average a first time period and a second time period (together or with additional time periods included), and then once a third time period is calculated, average the second time period and the third time period (together or with additional time periods included).

At box 610, the computing system combines multiple time periods to generate a value. The computing system may do this because referencing multiple time periods may provide greater accuracy than system reliance on a single time period. For example, the system may record a first time period (between a first pulse and a second pulse), a second time period (between the second pulse and a third pulse), and a third time period (between the third pulse and a fourth pulse). The computing system may combine these time periods by averaging them to generate a new value, or by adding them together to generate a new value, as just two of many examples.

At box 612, the computing system determines if the new value indicates that the rate of rotation exceeds an allowable rate. For example, the computing system may take the combination of the time periods (e.g., the average or combination of the time periods) and determine if the value is below a threshold that is determined based on user input that specifies the maximum rate of rotation. For example, an engine RPM of 9000 may correspond to one crankshaft rotation each 0.00667 seconds. As an illustration, suppose that a pulse is generated once per crankshaft revolution (in practice there are likely to be multiple pulses per revolution). If an average of multiple recently-recorded time periods is less than 0.00011 seconds, the system has identified that the rate of rotation exceeds the allowable rate.

At box 614, in response to having determined that the rate of rotation exceeds the allowable rate, the computing system may apply a corrective action to limit the rate of rotation. Doing so may involve the computing system performing actions to limit engine rate of rotation by inhibiting the firing of one or more cylinders (box 616). Any of the mechanisms for "dropping" one or more cylinders that are described throughout this disclosure may be suitable. Doing so may also or alternatively involve the computing system performing actions to retard ignition timing so that the power cycle of the engine generates less power (box 618). The computing system may limit the rate of rotation for a specified period of time, or until the measured time periods (or a value newly-generated therefrom, as described above) no longer indicates that the rate of rotation exceeds the allowable rate.

In some examples, the above-described process may be used to limit shaft rotation rate to fall at or beneath a maximum value at any time during vehicle operation. In some examples, the above-described process may be used to limit shaft rotation rate to a maximum value for a specific time period (e.g., just prior to a drag-racing vehicle launch), where that maximum value is lower than an overall maximum value that is applied during the post-launch portion of the race. In other words, prior to vehicle launch, the user may specify that the engine rate of rotation is not to exceed 6000 RPM, but once the vehicle is moving down the track, the engine RPM may be limited to not exceed 9000 RPM. The computing system may identify that the vehicle has launched and therefore may change the permissible maximum RPM, based on a received signal that indicates that the vehicle has transitioned from stationary to moving (e.g., a signal that is triggered by user input and that causes the vehicle transmission brake to release). In some implementations the above-described process is used to "drop" cylinders specified the zone settings in boxes 406, 408, and 410 (FIG. 4), as described above.

Restarting Power-Enhancement Timing

The computing system discussed herein may be able to enhance the power applied to the driven wheels during a race. An example power enhancement includes the introduction of nitrous oxide into the engine, although other power enhancements are possible, as described with regard to the "corrective actions" described above. With regard to nitrous oxide, the gas may be introduced into the engine as a series of "kits," one after another. Each "kit" refers to an amount of nitrous oxide that is introduced to the engine from one or more tanks of nitrous oxide (due to actuation of one or more solenoids that control the introduction of nitrous oxide from the tanks to the engine). The introduction of nitrous oxide may be staged so that a first amount of nitrous oxide is introduced into the engine at a first time, and a second amount is introduced at a second time (with a delay there between). The amounts of nitrous introduced may increase with each stage, and there may be more than two stages (e.g., three, four, five, six, or seven stages). The below description that is provided with reference to FIG. 7 describes an application of power enhancements and restarting the timing of power enhancements during a race due to occurrence of an event (e.g., the driver releasing the throttle).

At box 702, the computing system receives an indication that the vehicle has launched. For example, the system may receive an indication that user input selected the transmission brake to be released, and the vehicle is to launch. As another example, the system may receive an indication that user input increased the throttle.

At box 704, the computing system delays or waits before applying the power enhancement. For example, the computing system may begin a timer when the transmission brake releases, and wait until a previously-specified time period before beginning the first stage of power enhancement. The time period may be predetermined and may have been specified by user input before the user began the race (or was even at the racetrack).

At box 706, the computing system may begin applying stages of power enhancement. The computing system may do this by providing a signal that causes a solenoid to open and release nitrous oxide into the engine, for example. The computing system may begin applying a first stage of power enhancement without receiving user input that is after the release of the transmission brake and that specifies that the power enhancement is to be applied. Said another way, the application of power enhancement may be triggered based on the launch of the vehicle and termination of the above-described delay. In some examples, the above-described delay may change based on car performance or driver interaction with the throttle during the race, but the driver may not provide input that specifies that the power enhancement is to begin other than starting the race.

The computing system may provide the power enhancement by performing actions to cause a first stage of nitrous oxide to be introduced into the engine, followed by a delay before a second stage of nitrous oxide is introduced into the engine, potentially followed by successive delays and stages of nitrous oxide.

At box 708, the computing system receives an indication that power enhancement should be interrupted. In some examples, this indication is a result of the driver releasing the throttle a determined amount (e.g., the computing system identifying that that a throttle-position sensor has moved more than a threshold amount in a direction corresponding to throttle release). In some examples, the indication that power enhancement should be interrupted includes receiving an indication that the vehicle has lost traction, or that the vehicle has begun to travel at a velocity or with an acceleration that exceeds an acceptable velocity or acceleration. In some examples, the indication that power enhancement should be interrupted includes identifying that a temperature of a vehicle component exceeds a permissible level. In some examples, the indication that power enhancement should be interrupted includes the computing system receiving a signal indication that was generated by user input (e.g., due to a driver pressing a button during the race to restart the power enhancement timing).

At box 710, as a result of the computing system receiving the indication that the power enhancement should be interrupted, the computing system interrupts the power enhancement. For example, the computing system may interrupt the introduction of nitrous oxide into the engine by closing solenoids that may be open, and that would have remained open longer had the computing system not received the indication that power enhancement should be interrupted. Said another way, the computing system may stop one of the stages when that stage is part way through its introduction of nitrous oxide. In some examples, the computing system may finish a current stage, but may not proceed to the next stage of nitrous oxide introduction due to receiving the indication that power enhancement should be interrupted.

At box 712, the computing system receives an indication that power enhancement should resume. For example, the computing system may determine that the throttle position has moved a threshold amount in a direction corresponding to increased power, or that the throttle position has advanced to a position that corresponds to resumption of power enhancement. In some examples, the indication that power enhancement should resume includes identifying that the vehicle has resumed travel at an acceptable velocity or acceleration, or that the temperature of the vehicle components is at a permissible level.

At box 714, the computing system resumes its application of power enhancement. In some examples, it does this by resuming the power enhancement at the very beginning (e.g., by performing the delay of box 704 and then applying the power enhancement of box 706). It can also do this by resuming where power enhancement left off.

At box 716, the computing system resumes it application of power enhancement by applying the initial stage without the previous delay (e.g., without the delay that is described with respect to box 706). For example, although the computing system may wait a certain amount of time before beginning to apply a power enhancement after the launch of the vehicle (as described with respect to box 706), in response to the system determining that the power enhancement should resume, the system may begin applying the first stage of the power enhancement without a delay, or with a delay that is less than the delay described with respect to box 706.

At box 718, the computing system resumes applying the power enhancement by resuming a stage that was not completed. For example, if the third stage of power enhancement was interrupted due to the driver releasing the throttle (and thus the third stage was not completed), the computing system may resume power enhancement by applying the third stage again, from the beginning of that stage (and thus releasing all the nitrous associated with performance of that stage even though there was already a partial release of nitrous associated with that stage), with or without a delay before applying the third stage the second time.

At box 720, the computing system resumes application of power enhancement by resuming a recently-completed stage. For example, if the third stage of power enhancement was interrupted due to the driver releasing the throttle (and thus the third-stage was not completed), the computing system may resume power enhancement by applying the second stage or the first stage, with or without a delay before applying the second stage. In some user-specified scenarios, the system may resume with the first or second stage if the third stage completed before the multi-stage power enhancement process was interrupted.

Figure 7:
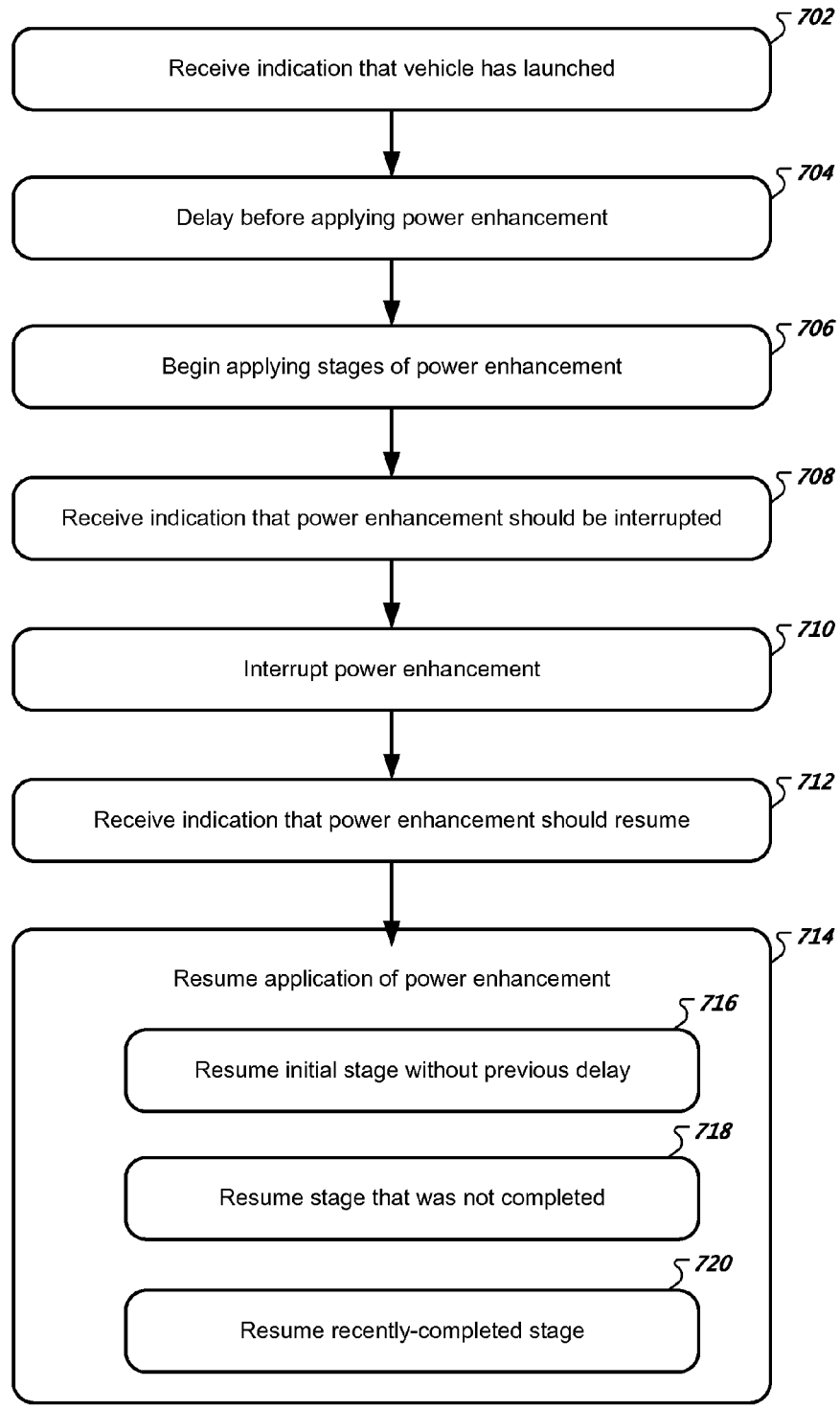
FIG. 7 shows a flowchart of a process for restarting power-enhancement timing.

Although not shown in the flowchart of FIG. 7, a user (e.g., the driver or a person on his team) may be able to configure certain characteristics of the above-described process. With regard to application of power enhancement, users may be able to specify with the computing system how many stages to apply, the duration of the stage (e.g., how long the application of nitrous oxide for each stage is to last), a time delay between each stage, a time of the race at which each stage is to begin, and/or a vehicle speed or RPM at which each stage is to begin. A user may specify these parameters with a laptop, and may download the instructions to a computing device that travels with the vehicle and that controls various vehicle components. With regard to interrupting and resuming power enhancement, a user may be able to specify the level of throttle change that prompts interruption of power enhancement, and may be able to specify the level of throttle change that prompts resuming power enhancement.

With regard to the resumption of power enhancement, a user may be able to specify, for each portion of the power enhancement (e.g., for an interruption during each of the stages and for an interruption between each of the stages), how the system is to resume power enhancement (e.g., which stage at which to resume, whether to precede resumption at that stage with a delay, and a length of such a delay). User input may also be able to specify a different level of nitrous oxide to apply during a second application of a stage (e.g., more or less nitrous may be introduced than when the stage was first performed or attempted). User input may be able to specify a completely different set of stages and delays that are unique to each interruption of power enhancement.

The computing system may be able to resume power enhancement at an intermediate stage of the power enhancement, as described above (e.g., not at the very beginning or exactly where the enhancement left off), because resuming power enhancement at exactly where the system left off may provide an excessive amount of power enhancement that may cause engine harm, or may cause an excessive amount of immediate power and possible loss of control of the vehicle. On the other hand, starting at the beginning may provide a limited amount of power enhancement that may not propel the vehicle down the track as optimally as possible.

In some implementations, the computing system modifies the application of other power enhancements, such as the amount of lock up provided by a torque converter, or the amount of charge pressure in the torque converter. As previously mentioned, the computing system may modify any of the above-described "corrective actions."

Traction Control Specified by Zone

The computing system discussed herein may operate as a traction control device. For example, the computing system may analyze the rate of rotation of a rotating shaft of the vehicle and, if the rate of rotation or a derivative thereof (e.g., the acceleration) changes faster than an acceptable rate (e.g., as described by U.S. Pat. No. 8,554,440, the entire contents of which are hereby incorporated by reference), the computing system may initiate a traction control operation (e.g., retard engine timing or drop one or more engine cylinders). The system may allow the user to adjust the traction control sensitivity (e.g., the level at which an increase in shaft rotation velocity, acceleration, or change thereof is unacceptable and results in a traction control operation). This sensitivity adjustment may be zone specific. As an illustration with reference to FIG. 4, the user may be able to interact with a user interface element in box 406 (the element is not shown in FIG. 4B) to specify a "low" traction control sensitivity for Zone 1, interact with a user interface element in box 408 to specify a "medium" traction control sensitivity for Zone 2, and interact with a user interface element in box 410 to specify a "high" traction control sensitivity for Zone 3. As such, the user may have multiple traction control sensitivity options for each zone, and in this example has specified that the system should be more sensitive at high rates of speed. As discussed elsewhere in this document, a user may add and remove zones (and thus add and remove traction control settings), and change the length of the zones.

Traction Control Accounts for Change in Slope

The computing system may determine whether to activate a traction control response by comparing a recent rate of change in a vehicle characteristic to a rate of change of the vehicle characteristic over a longer period of time. The vehicle characteristic that is monitored may be a rate of rotation of a rotating vehicle component (e.g., RPMs of a driveshaft), although the other vehicle characteristics discussed throughout this application may be monitored (e.g., the other rotating shafts, the amount of power enhancement, etc.). A process for performing this traction control process is described with respect to FIGS. 8A and 8B, as discussed below.

At box 802, the computing system identifies that a race has begun and, in response, the computing system institutes a delay. The system may determine that the race has begun in various manners, including those described throughout this document, for example, determining that a vehicle shaft has begun to rotate or that the transmission brake has been released. The delay may be a predetermined length of time (e.g., a length of time specified by a user before the run). The delay may be that performed before the system initially (e.g., for the first time in the race) determines whether to activate a traction control response, or may be a period in which the system inhibits any traction control activation (even though the computing system may be calculating whether to activate a traction control response).

At box 804, the computing system records data. This data may identify characteristics of the monitored vehicle component, for example, the rate of rotation of a vehicle shaft. In some examples, the system monitors the rate of rotation by identifying how many portions of a rotating vehicle shaft pass a sensor over a fixed amount of time, or the amount of time between when a first portion of a rotating vehicle shaft passes the sensor to when a second portion of the rotating vehicle shaft passes the sensor. The portions of the rotating vehicle shaft may be markers that are evenly-spaced around the rotating vehicle shaft. The computing system may record the data from the moment that the race is determined to begin or before the launch.

At box 806, the computing system identifies a recent rate of change. The recent rate of change may be a change in the recorded data between a recent measurement of the monitored vehicle component (e.g., a most-recent RPM measurement or time of rotation) and an older measurement of the monitored vehicle component. The older measurement may be a measurement of a determined age, such as one-tenth of a second, or a measurement that is a determined number of measurements in the past, such as twenty measurements ago. The recent rate of change may be calculated regularly during the race (e.g., with every recorded data point or at regular intervals). As an illustration of such a calculation, during a race in which the actual shaft RPMs are illustrated by the line in the plot of FIG. 8B, the computing system may determine a slope or difference 852 between data point 850 and 854. The slope or difference 852 may account for just the difference in RPMs (e.g., about 1000 RPMs in this illustration) or a difference in RPMs over time (e.g., 1000 RPMs divided by about 0.4 seconds).

At box 808, the computing system determines a historical rate of change. The historical rate of change may be determined by identifying a slope or difference 858 over a longer period of time. For example, the computing system may determine the historical rate of change from point 850 to point 856. In this example, the historical rate of change is measured between a recent or most-recently-recorded data point and a 0 RPM data point or a data point at which the race began. In some examples, however, the length in time over which the slope is calculated can be a pre-determined length of time (e.g., a user-specified length of time or a user-specified number of data measurements). The length in time for the historical rate of change calculation may be longer than the length of time for the recorded recent rate of change, but may not have to go back to the start of the race as illustrated in FIG. 8B. The slope or difference 852 for the recent rate of change may cover a subset of the data points used to calculate the slope or difference 858 for the historical rate of change. The slope or difference 858 for the historical rate of change may be calculated the same as that for the slope or difference 852 for the recent rate of change, or may be different.

At box 810, the computing system determines if a comparison of the recent rate of change to the historical rate of change satisfies a criteria. As an example, the computing system determines whether a difference between slope 852 and slope 858 satisfies a certain criteria. In some examples the criteria is satisfied if the difference in slopes (e.g., the historical rate of change slope subtracted from the recent rate of change slope) is below a threshold, or if the recent rate of change slope is greater than the historical rate of change slope. As an illustration, should the plotted RPMs suddenly increase due to wheel slippage, the difference between the recent slope 852 and the historical slope 858 may become less pronounced, which may cause the criteria to be satisfied. As such, this type of a system may be different than a system that compares a recent rate of change (e.g., slope 852) to a preset criteria that does not differ as the race progresses. Here, the two items of comparison may regularly change.

At box 812, the computing system activates a traction control mechanism if the comparison satisfies the criteria. For example, if the difference between the recent slope 852 and the historical slope 858 satisfies the above-described criteria, the computing system may retard the ignition timing or drop one or more cylinders, as described above.

As illustrated by the arrow between boxes 810 and 804, the computing system may continuously or regularly record data (box 804), identify the recent rate of change (box 806), identify the historical rate of change (box 808), and determine if a comparison satisfies the criteria (box 810). Indeed, as shown in FIG. 8B, this comparison can be performed repeatedly throughout the race, for example, at comparisons 2 and 3 (identified by numbers in bubbles in the figure). As indicated by comparisons 1, 2, and 3, the comparisons can occur in different zones. Moreover, the criteria for determining whether to activate traction control can differ in each zone (but may be the same for all calculations while the race is within the zone). The criteria may be selected based on the current time of the race (e.g., whether data point 850 is in Zone 1, 2, or 3).

The traction control mechanism discussed herein may be performed in addition to the power adjustments that are affected by whether the actual rate of rotation during a race enters any of the ranges that are described throughout this document and that are shown in FIGS. 3 and 4B. The mechanism for reducing power to the wheels with a traction control activation and an activation based on the RPMs entering a "Red Range" or "Green Range—High" may be the same or different.

Figure 9:
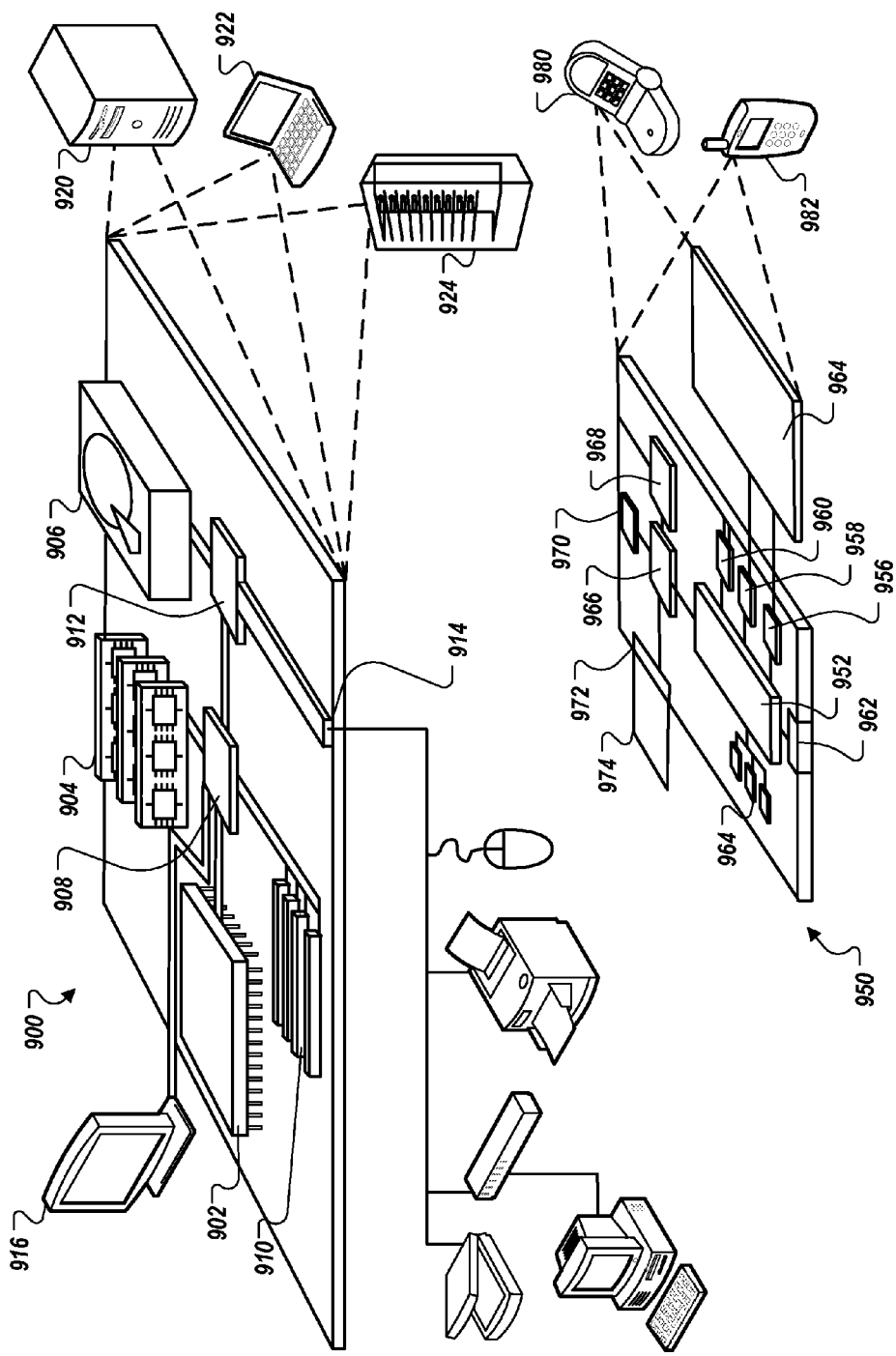
FIG. 9 shows an example of a computing device and a mobile computing device that can be used to implement the techniques, methods, systems, and other mechanisms described herein.

FIG. 9 shows an example of a computing device 900 and a mobile computing device that can be used to implement the techniques described herein. The computing device 900 and mobile computing device, for example, may be devices in which the GUI is presented and the software run for identifying a preliminary run curve and generating the target run curve. The devices may also be located on the vehicle and can act as controllers for affecting changes in vehicle shaft rotation rates. In some implementations, a single device permits the user to generate the target run curve and then implements the rotation rate changes (e.g., such as when a laptop device is used to generate the target run curve and then rides along in the car during the race in order to control the rotation rate changes). In some implementations, a first device generates the target run curve (e.g., a laptop that displays the user interfaces described with respect to FIGS. 1 through 4B), and another device receives data from the first device and implements the rotation rate changes (e.g., a vehicle control unit computing device may implement the rotation rate changes described with respect to FIG. 5). Both devices may be considered part of a single computing system. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 904 stores information within the computing device 900. In some implementations, the memory 904 is a volatile memory unit or units. In some implementations, the memory 904 is a non-volatile memory unit or units. The memory 904 may also be another form of computer-readable medium, such as a magnetic or optical disk.

The storage device 906 is capable of providing mass storage for the computing device 900. In some implementations, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. The computer program product may also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. In some implementations, the high-speed interface 908 is coupled to the memory 904, the display 916 (e.g., through a graphics processor or accelerator), and to the high-speed expansion ports 910, which may accept various expansion cards (not shown). In the implementation, the low-speed interface 912 is coupled to the storage device 906 and the low-speed expansion port 914. The low-speed expansion port 914, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. In addition, it may be implemented in a personal computer such as a laptop computer 922. It may also be implemented as part of a rack server system 924. Alternatively, components from the computing device 900 may be combined with other components in a mobile device (not shown), such as a mobile computing device 950. Each of such devices may contain one or more of the computing device 900 and the mobile computing device 950, and an entire system may be made up of multiple computing devices communicating with each other.

The mobile computing device 950 includes a processor 952, a memory 964, an input/output device such as a display 954, a communication interface 966, and a transceiver 968, among other components. The mobile computing device 950 may also be provided with a storage device, such as a micro-drive or other device, to provide additional storage. Each of the processor 952, the memory 964, the display 954, the communication interface 966, and the transceiver 968, are interconnected using various buses, and several of the components may be mounted on a common motherboard or in other manners as appropriate.

The processor 952 can execute instructions within the mobile computing device 950, including instructions stored in the memory 964. The processor 952 may be implemented as a chipset of chips that include separate and multiple analog and digital processors. The processor 952 may provide, for example, for coordination of the other components of the mobile computing device 950, such as control of user interfaces, applications run by the mobile computing device 950, and wireless communication by the mobile computing device 950.

The processor 952 may communicate with a user through a control interface 958 and a display interface 956 coupled to the display 954. The display 954 may be, for example, a TFT (Thin-Film-Transistor Liquid Crystal Display) display or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may provide communication with the processor 952, so as to enable near area communication of the mobile computing device 950 with other devices. The external interface 962 may provide, for example, for wired communication in some implementations, or for wireless communication in other implementations, and multiple interfaces may also be used.

The memory 964 stores information within the mobile computing device 950. The memory 964 can be implemented as one or more of a computer-readable medium or media, a volatile memory unit or units, or a non-volatile memory unit or units. An expansion memory 974 may also be provided and connected to the mobile computing device 950 through an expansion interface 972, which may include, for example, a SIMM (Single In Line Memory Module) card interface. The expansion memory 974 may provide extra storage space for the mobile computing device 950, or may also store applications or other information for the mobile computing device 950. Specifically, the expansion memory 974 may include instructions to carry out or supplement the processes described above, and may include secure information also. Thus, for example, the expansion memory 974 may be provide as a security module for the mobile computing device 950, and may be programmed with instructions that permit secure use of the mobile computing device 950. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. The computer program product contains instructions that, when executed, perform one or more methods, such as those described above. The computer program product can be a computer- or machine-readable medium, such as the memory 964, the expansion memory 974, or memory on the processor 952. In some implementations, the computer program product can be received in a propagated signal, for example, over the transceiver 968 or the external interface 962.

The mobile computing device 950 may communicate wirelessly through the communication interface 966, which may include digital signal processing circuitry where necessary. The communication interface 966 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 968 using a radio-frequency. In addition, short-range communication may occur, such as using a Bluetooth, WiFi, or other such transceiver (not shown). In addition, a GPS (Global Positioning System) receiver module 970 may provide additional navigation- and location-related wireless data to the mobile computing device 950, which may be used as appropriate by applications running on the mobile computing device 950.

The mobile computing device 950 may also communicate audibly using an audio codec 960, which may receive spoken information from a user and convert it to usable digital information. The audio codec 960 may likewise generate audible sound for a user, such as through a speaker, e.g., in a handset of the mobile computing device 950. Such sound may include sound from voice telephone calls, may include recorded sound (e.g., voice messages, music files, etc.) and may also include sound generated by applications operating on the mobile computing device 950.

The mobile computing device 950 may be implemented in a number of different forms, as shown in the figure. For example, it may be implemented as a cellular telephone 980. It may also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor. One or more non-transitory computer-readable media having instructions stored thereon that, when executed by one or more processors, cause performance of operations can include some of the operations being performed by a first processor executing instructions stored on a first set of one or more computer-readable media, and a second processor executing instructions stored on a different and second set of one or more computer-readable media.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although various implementations have been described in detail above, other modifications are possible. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method, comprising:
   identifying, by a computing system that is configured to control a rate of rotation of a vehicle shaft of a vehicle, multiple target rotation rates for the vehicle shaft that correspond to respective times during an anticipated vehicle race, at least some of the multiple target rotation rates being different from each other;
   determining, by the computing system, that (1) a first actual rotation rate for the vehicle shaft at a first time during a first actual vehicle race exceeds (2) a first target rotation rate, from among the multiple target rotation rates, that is for a first time during the anticipated vehicle race that corresponds to the first time during the first actual vehicle race;
   sending, by the computing system and in response to having determined that the first actual rotation rate exceeds the first target rotation rate, a first signal for receipt by a first component of the vehicle, in order to cause the first component of the vehicle to limit the rate of rotation of the vehicle shaft;
   determining, by the computing system, that (1) a second actual rotation rate for the vehicle shaft at a second time during the first actual vehicle race is below (2) a second target rotation rate, from among the multiple target rotation rates, that is for a second time during the anticipated vehicle race that corresponds to the second time during the first actual vehicle race; and
   sending, by the computing system and in response to having determined that the second actual rotation rate is below the second target rotation rate, a second signal for receipt by the first component of the vehicle or a second component of the vehicle, in order to cause the first component of the vehicle or the second component of the vehicle to increase the rate of rotation of the vehicle shaft.

2. The computer-implemented method of claim 1, further comprising:
   identifying, for each of one or more past races, data that indicates actual vehicle shaft rotation rates for corresponding times during each of the one or more past races; and
   determining, based on the data that indicates the actual vehicle shaft rotation rates for each of the one or more past races, the multiple target rotation rates for the anticipated race.

3. The computer-implemented method of claim 2, wherein:
   identifying the data that indicates actual vehicle shaft rotation rates comprises identifying, for each of multiple past races, a set of data that indicates actual vehicle shaft rotation rates, and determining the multiple target rotation rates for the anticipated race comprises combining each identified set of data that indicates actual vehicle shaft rotation rates.

4. The computer-implemented method of claim 2, further comprising:

combining the data that indicates actual vehicle shaft rotation rates for each of the one or more past races to create a preliminary run curve that specifies preliminary target rotation rates for times during the anticipated race; and creating a target run curve that specifies the multiple target rotation rates by affecting changes to a preliminary target rotation rate specified by the preliminary run curve.

5. The computer-implemented method of claim 4, wherein creating the target run curve comprises:

presenting a plotted representation of the preliminary run curve within a graphical user interface on an electronic display;

identifying that user input has selected and dragged a portion of the plotted representation of the preliminary run curve that corresponds to the preliminary target rotation rate specified by the preliminary run curve; and changing the preliminary target rotation rate based on an amount that the user input dragged the portion of the plotted representation of the preliminary run curve.

6. The computer-implemented method of claim 1, further comprising determining a first amount for which the first signal is to specify that the rate of rotation of the vehicle shaft be limited based on a first amount that the first actual rotation rate is determined to exceed the first target rotation rate, wherein the first signal indicates the first amount for which the rate of rotation of the vehicle shaft is to be limited.

7. The computer-implemented method of claim 6, further comprising identifying that the first time during the anticipated vehicle race occurs within a first time zone of the anticipated race, from among multiple time zones of the anticipated race, wherein each of the multiple time zones of the anticipated race corresponds to a different portion of the anticipated race, wherein at least some of the multiple time zones are assigned different values for limiting the rate of rotation of the vehicle shaft by different amounts when an actual rotation rate for the vehicle shaft is determined to exceed a corresponding target rotation rate for the vehicle shaft by the first amount.

8. The computer-implemented method of claim 1, further comprising:

receiving user input that specifies, for the first time during the anticipated vehicle race, (i) a first excessive rotation rate, and (ii) a first level of corrective action associated with the first excessive rotation rate; and determining a first amount for which the first signal is to specify that the rate of rotation of the vehicle shaft be limited, the first amount being a proportion of the first level of corrective action based on a proportion that the first actual rotation rate exceeds the first target rotation rate, with respect to the first excessive rotation rate.

9. The computer-implemented method of claim 1, wherein the first signal identifies an amount of ignition timing retard that is to be affected by the first component of the vehicle in order to cause the first component of the vehicle to limit the rate of rotation of the vehicle shaft.

10. The computer-implemented method of claim 9, wherein the second signal identifies an amount of ignition timing advance that is to be affected by the first component of the vehicle or the second component of the vehicle in order to cause the first component of the vehicle or the second component of the vehicle to increase the rate of rotation of the vehicle shaft.

11. One or more non-transitory computer-readable media having instructions stored thereon that, when executed by one or more processors, cause performance of operations comprising:

identifying, by a computing system that is configured to control a rate of rotation of a vehicle shaft of a vehicle, multiple target rotation rates for the vehicle shaft that correspond to respective times during an anticipated vehicle race, at least some of the multiple target rotation rates being different from each other;

determining, by the computing system, that (1) a first actual rotation rate for the vehicle shaft at a first time during a first actual vehicle race exceeds (2) a first target rotation rate, from among the multiple target rotation rates, that is for a first time during the anticipated vehicle race that corresponds to the first time during the first actual vehicle race;

sending, by the computing system and in response to having determined that the first actual rotation rate exceeds the first target rotation rate, a first signal for receipt by a first component of the vehicle, in order to cause the first component of the vehicle to limit the rate of rotation of the vehicle shaft;

determining, by the computing system, that (1) a second actual rotation rate for the vehicle shaft at a second time during the first actual vehicle race is below (2) a second target rotation rate, from among the multiple target rotation rates, that is for a second time during the anticipated vehicle race that corresponds to the second time during the first actual vehicle race; and sending, by the computing system and in response to having determined that the second actual rotation rate is below the second target rotation rate, a second signal for receipt by the first component of the vehicle or a second component of the vehicle, in order to cause the first component of the vehicle or the second component of the vehicle to increase the rate of rotation of the vehicle shaft.

12. The one or more non-transitory computer-readable media of claim 11, wherein the operations further comprise:

identifying, for each of one or more past races, data that indicates actual vehicle shaft rotation rates for corresponding times during each of the one or more past races; and determining, based on the data that indicates the actual vehicle shaft rotation rates for each of the one or more past races, the multiple target rotation rates for the anticipated race.

13. The one or more non-transitory computer-readable media of claim 12, wherein:

identifying the data that indicates actual vehicle shaft rotation rates comprises identifying, for each of multiple past races, a set of data that indicates actual vehicle shaft rotation rates, and determining the multiple target rotation rates for the anticipated race comprises combining each identified set of data that indicates actual vehicle shaft rotation rates.

14. The one or more non-transitory computer-readable media of claim 12, wherein the operations further comprise:
- combining the data that indicates actual vehicle shaft rotation rates for each of the one or more past races to create a preliminary run curve that specifies preliminary target rotation rates for times during the anticipated race; and
- creating a target run curve that specifies the multiple target rotation rates by affecting changes to a preliminary target rotation rate specified by the preliminary run curve.

15. The one or more non-transitory computer-readable media of claim 14, wherein creating the target run curve comprises:
- presenting a plotted representation of the preliminary run curve within a graphical user interface on an electronic display;
- identifying that user input has selected and dragged a portion of the plotted representation of the preliminary run curve that corresponds to the preliminary target rotation rate specified by the preliminary run curve; and
- changing the preliminary target rotation rate based on an amount that the user input dragged the portion of the plotted representation of the preliminary run curve.

16. The one or more non-transitory computer-readable media of claim 11, wherein the operations further comprise determining a first amount for which the first signal is to specify that the rate of rotation of the vehicle shaft be limited based on a first amount that the first actual rotation rate is determined to exceed the first target rotation rate,
- wherein the first signal indicates the first amount for which the rate of rotation of the vehicle shaft is to be limited.

17. The one or more non-transitory computer-readable media of claim 16, wherein the operations further comprise identifying that the first time during the anticipated vehicle race occurs within a first time zone of the anticipated race, from among multiple time zones of the anticipated race,
- wherein each of the multiple time zones of the anticipated race corresponds to a different portion of the anticipated race,
- wherein at least some of the multiple time zones are assigned different values for limiting the rate of rotation of the vehicle shaft by different amounts when an actual rotation rate for the vehicle shaft is determined to exceed a corresponding target rotation rate for the vehicle shaft by the first amount.

18. The one or more non-transitory computer-readable media of claim 11, wherein the operations further comprise:
- receiving user input that specifies, for the first time during the anticipated vehicle race, (i) a first excessive rotation rate, and (ii) a first level of corrective action associated with the first excessive rotation rate; and
- determining a first amount for which the first signal is to specify that the rate of rotation of the vehicle shaft be limited, the first amount being a proportion of the first level of corrective action based on a proportion that the first actual rotation rate exceeds the first target rotation rate, with respect to the first excessive rotation rate.

19. The one or more non-transitory computer-readable media of claim 11, wherein the first signal identifies an amount of ignition timing retard that is to be affected by the first component of the vehicle in order to cause the first component of the vehicle to limit the rate of rotation of the vehicle shaft.

20. The one or more non-transitory computer-readable media of claim 19, wherein the second signal identifies an amount of ignition timing advance that is to be affected by the first component of the vehicle or the second component of the vehicle in order to cause the first component of the vehicle or the second component of the vehicle to increase the rate of rotation of the vehicle shaft.

* * * * *